United States Patent
Yang

(10) Patent No.: US 11,445,150 B2
(45) Date of Patent: Sep. 13, 2022

(54) MULTI-CAMERA COLLABORATION-BASED IMAGE PROCESSING METHOD AND VIDEO SURVEILLANCE SYSTEM

(71) Applicant: HUAWEI TECHNOLOGIES CO., LTD., Guangdong (CN)

(72) Inventor: Ligang Yang, Hangzhou (CN)

(73) Assignee: HUAWEI TECHNOLOGIES CO., LTD., Shenzhen (CN)

( * ) Notice: Subject to any disclaimer, the term of this patent is extended or adjusted under 35 U.S.C. 154(b) by 0 days.

(21) Appl. No.: 17/120,471

(22) Filed: Dec. 14, 2020

(65) Prior Publication Data

US 2021/0136326 A1    May 6, 2021

Related U.S. Application Data

(63) Continuation of application No. PCT/CN2019/094119, filed on Jul. 1, 2019.

(30) Foreign Application Priority Data

Aug. 1, 2018 (CN) .......................... 201810864729.1

(51) Int. Cl.
*H04N 7/18* (2006.01)
*G06K 9/62* (2022.01)
(Continued)

(52) U.S. Cl.
CPC .......... *H04N 7/181* (2013.01); *G06K 9/6215* (2013.01); *G06V 20/46* (2022.01); *G06V 20/52* (2022.01);
(Continued)

(58) Field of Classification Search
CPC ............... H04N 7/181; H04N 5/23229; H04N 5/23219; G06K 9/00771; G06K 9/00744
See application file for complete search history.

(56) References Cited

U.S. PATENT DOCUMENTS 8,189,059 B2 * 5/2012 Nozaki ............ H04N 5/232061
  348/211.3
8,284,254 B2 * 10/2012 Romanowich ......... H04N 5/247
  348/154

(Continued)

FOREIGN PATENT DOCUMENTS

CN     101639891 A     2/2010
CN     103317514 A     9/2013
(Continued)

OTHER PUBLICATIONS

Li Zhihua, Research on Object Tracking and Classification for Intelligent Video Surveillance, Zhejiang University, 2009, 3 pages (abstract).

*Primary Examiner* — Boubacar Abdou Tchoussou

(57) ABSTRACT

A video surveillance system includes at least two camera and an analysis device. The at least two cameras include a first image camera and a second image camera. The method includes: separately obtaining, by the first image camera and the second image camera, a photographed first image and a photographed second image; obtaining indication information of a target task; separately obtaining first execution result information and second execution result information of the target task based on the indication information of the target task; sending, the first execution result information and the second execution result information to the analysis device; and determining, by the analysis device, third execution result information of the target task based on the first execution result information and the second execution result information.

30 Claims, 11 Drawing Sheets

(51) Int. Cl.
  *H04N 5/232* (2006.01)
  *G06V 20/40* (2022.01)
  *G06V 20/52* (2022.01)
  *H04L 67/025* (2022.01)
  *H04L 67/125* (2022.01)

(52) U.S. Cl.
  CPC .......... *H04L 67/025* (2013.01); *H04L 67/125* (2013.01); *H04N 5/23206* (2013.01)

(56) References Cited

U.S. PATENT DOCUMENTS

| | | | | |
|---|---|---|---|---|
| 10,110,801 | B2 * | 10/2018 | Leung | H04N 5/247 |
| 10,699,422 | B2 * | 6/2020 | Oami | H04N 5/23229 |
| 11,158,068 | B2 * | 10/2021 | Oami | G06T 1/0007 |
| 2004/0150724 | A1 * | 8/2004 | Nozaki | H04N 5/232933 |
| | | | | 348/211.4 |
| 2005/0244033 | A1 | 11/2005 | Ekin et al. | |
| 2007/0039030 | A1 * | 2/2007 | Romanowich | H04N 5/247 |
| | | | | 725/105 |
| 2008/0198231 | A1 | 8/2008 | Ozdemir et al. | |
| 2012/0249806 | A1 | 10/2012 | Gong et al. | |
| 2014/0214885 | A1 | 7/2014 | Park et al. | |
| 2016/0191779 | A1 | 6/2016 | Yang et al. | |
| 2017/0006215 | A1 * | 1/2017 | Leung | G08B 13/19641 |
| 2017/0178345 | A1 * | 6/2017 | Pham | G06T 7/277 |
| 2019/0035093 | A1 * | 1/2019 | Oami | H04N 7/181 |
| 2019/0238786 | A1 * | 8/2019 | Takahashi | H04N 7/181 |

FOREIGN PATENT DOCUMENTS

| | | |
|---|---|---|
| CN | 103856762 A | 6/2014 |
| CN | 104008371 A | 8/2014 |
| CN | 104850700 A | 8/2015 |
| CN | 104951775 A | 9/2015 |
| CN | 105872474 A | 8/2016 |

* cited by examiner

MULTI-CAMERA COLLABORATION-BASED IMAGE PROCESSING METHOD AND VIDEO SURVEILLANCE SYSTEM

CROSS-REFERENCE TO RELATED APPLICATIONS

This application is a continuation of International Application No. PCT/CN2019/094119, filed on Jul. 1, 2019, which claims priority to Chinese Patent Application No. 201810864729.1, filed on Aug. 1, 2018. The disclosures of the aforementioned applications are hereby incorporated by reference in their entireties.

TECHNICAL FIELD

This application relates to the field of communications technologies, and in particular, to a multi-camera collaboration-based image processing method and video surveillance system.

BACKGROUND

As a large quantity of video surveillance applications require quick identity recognition in a long distance without cooperation from a user, intelligent video surveillance technologies are developing instantly. An intelligent video surveillance system usually includes a plurality of internet protocol cameras (IPC). When a surveillance target, for example, a dangerous person or a wanted vehicle appears in a surveillance deployment area of the intelligent video surveillance system, an intelligent warning can be triggered.

In the existing intelligent video surveillance field, each IPC in the intelligent video surveillance system independently completes intelligent analysis on a surveillance object. However, different IPCs have different performance (for example, a difference between hardware or software), and photographing areas of the different IPCs correspond to different environments. Even angles presented by surveillance objects in images photographed by the different IPCs are different. As a result, a specific random error is caused in an intelligent analysis result of the surveillance object obtained by the intelligent video surveillance system. This greatly affects reliability of the intelligent video surveillance system, and hinders the development of the intelligent video surveillance technologies.

SUMMARY

Embodiments of this application provide a multi-camera collaboration-based image processing method and video surveillance system, to resolve a problem that a specific random error in an intelligent analysis result of the surveillance object obtained by the intelligent video surveillance system reduces reliability of the intelligent video surveillance system.

A first aspect of this application provides a multi-camera collaboration-based image processing method, applied to a video surveillance system. The video surveillance system includes at least two image obtaining units and an analysis unit. The at least two image obtaining units include a first image obtaining unit and a second image obtaining unit. The method includes:

separately obtaining, by the first image obtaining unit and the second image obtaining unit, a photographed first image and a photographed second image; obtaining, by the first image obtaining unit and the second image obtaining unit, indication information of a target task, where the indication information of the target task is used to indicate to process a target object in a photographed image; separately obtaining, by the first image obtaining unit and the second image obtaining unit, first execution result information and second execution result information of the target task based on the indication information of the target task, where the first execution result information includes first processing result information corresponding to the target object in the first image, and the second execution result information includes second processing result information corresponding to the target object in the second image; sending, by the first image obtaining unit and the second image obtaining unit, the first execution result information and the second execution result information to the analysis unit; and determining, by the analysis unit, third execution result information of the target task based on the first execution result information and the second execution result information.

In the video surveillance system provided in this application, image obtaining units in at least two IPCs may obtain the indication information of the target task, separately obtain different execution result information of the target task based on the indication information of the target task, and then send the obtained execution result information to a device deployed in the analysis unit. The device deployed in the analysis unit may determine the third execution result information of the target task based on the execution result information from the different IPCs. Compared with execution result information that is of the target task and that is obtained by a single IPC, the third execution result information that is of the target task and that is obtained by the video surveillance system in this application through multi-camera collaboration helps reduce a random error to improve reliability of the video surveillance system.

In a possible implementation of the first aspect of this application, the video surveillance system further includes a task allocation unit, and before the obtaining, by the first image obtaining unit, indication information of a target task, the method further includes: obtaining, by the task allocation unit, the indication information of the target task; and sending, by the task allocation unit, the indication information of the target task to the first image obtaining unit. This helps adjust the target task executed by the video surveillance system, and improve flexibility of the method in this application.

In another possible implementation of the first aspect of this application, after the obtaining, by the first image obtaining unit, indication information of a target task, and before the obtaining, by the first image obtaining unit, first execution result information of the target task based on the indication information of the target task, the method further includes: determining, by the first image obtaining unit, whether to accept the target task; and if the first image obtaining unit accepts the target task, performing, by the first image obtaining unit, the step of obtaining first execution result information of the target task based on the indication information of the target task. This helps the image obtaining unit independently select to execute the target task, and helps the video surveillance system more properly allocate the target task.

In another possible implementation of the first aspect of this application, after the obtaining, by the task allocation unit, the indication information of the target task, and before the sending, by the task allocation unit, the indication information of the target task to the first image obtaining unit, the method further includes: selecting, by the task allocation unit, the first image obtaining unit from the at least two image obtaining units. This helps the task allocation unit independently select an IPC to execute the target task, and helps the video surveillance system more properly allocate the target task.

In another possible implementation of the first aspect of this application, the selecting, by the task allocation unit, the first image obtaining unit from the at least two image obtaining units includes: receiving, by the task allocation unit, resource information sent by the at least two image obtaining units; and selecting, by the task allocation unit, the first image obtaining unit from the at least two image obtaining units based on the resource information. An optional manner in which the task allocation unit selects the first image obtaining unit from the at least two image obtaining units is provided, to improve feasibility of the solutions of this application.

In another possible implementation of the first aspect of this application, the selecting, by the task allocation unit, the first image obtaining unit from the at least two image obtaining units includes: determining, by the task allocation unit, a type of the target task; and determining, by the task allocation unit, based on a pre-established correspondence between a task type and an image obtaining unit, that the target task corresponds to the first image obtaining unit. An optional manner in which the task allocation unit selects the first image obtaining unit from the at least two image obtaining units is provided, to improve feasibility of the solutions of this application.

In another possible implementation of the first aspect of this application, the selecting, by the task allocation unit, the first image obtaining unit from the at least two image obtaining units includes: determining, by the task allocation unit, area information corresponding to the target task; and selecting, by the task allocation unit, the first image obtaining unit from the at least two image obtaining units based on the area information. An optional manner in which the task allocation unit selects the first image obtaining unit from the at least two image obtaining units is provided, to improve feasibility of the solutions of this application.

In another possible implementation of the first aspect of this application, after the obtaining, by the second image obtaining unit, the second image, and before the obtaining, by the task allocation unit, the indication information of the target task, the method further includes: determining, by the second image obtaining unit, whether the second image meets a preset condition; if the second image meets the preset condition, sending, by the second image obtaining unit, initiation information of the target task to the task allocation unit, where the initiation information is used to indicate the task allocation unit to send the indication information of the target task; and the obtaining, by the task allocation unit, the indication information of the target task includes: obtaining, by the task allocation unit, the indication information of the target task based on the initiation information of the target task. The image obtaining unit in the video surveillance system may be an initiator of the target task, to help initiate the target task based on an actual situation of a surveillance area of the video surveillance system, and improve the flexibility of the method in this application.

In another possible implementation of the first aspect of this application, the determining, by the second image obtaining unit, whether the second image meets a preset condition includes: extracting, by the second image obtaining unit, second characteristic information of the target object from the second image; obtaining, by the second image obtaining unit, second similarity information, wherein the second similarity information is used to indicate a similarity between a to-be-recognized object and the target object in the second image; determining, by the second image obtaining unit, whether the second similarity information meets a first similarity condition; and if the second similarity information meets the first similarity condition, determining, by the second image obtaining unit, that the second image meets the preset condition. An optional method for which the second image obtaining unit determines whether the second image meets the preset condition is provided, to help improve the feasibility of the solutions of this application.

In another possible implementation of the first aspect of this application, the first processing result information is related to characteristic information of the target object in the first image, and the second processing result information is related to characteristic information of the target object in the second image. Processing result information is refined, so that the solutions of this application are more comprehensive. This improves the feasibility of the embodiments of this application.

In another possible implementation of the first aspect of this application, the target task is image recognition, and the indication information of the target task includes characteristic information of the to-be-recognized image; and the obtaining, by the first image obtaining unit, first execution result information of the target task includes: extracting, by the first image obtaining unit, first characteristic information of the target object from the first image; and obtaining, by the first image obtaining unit, based on the first characteristic information and the characteristic information of the to-be-recognized image, first similarity information between the to-be-recognized object and the target object in the first image. The solutions of this application are refined, so that the solutions of this application are more comprehensive. This improves the feasibility of the embodiments of this application.

In another possible implementation of the first aspect of this application, the indication information of the target task further includes a third similarity condition, and after the obtaining, by the first image obtaining unit, first execution result information of the target task based on the indication information of the target task, and before the sending, by the first image obtaining unit, the first execution result information to the analysis unit, the method further includes: determining, by the first image obtaining unit, whether the first similarity information meets the third similarity condition; and if the first similarity information meets the third similarity condition, performing, by the first image obtaining unit, the step of sending the first execution result information to the analysis unit. After receiving the indication information of the target task, the image obtaining unit screens the obtained execution result information of the target task, to help reduce a data transmission amount and a data processing amount of the video surveillance system, and further help improve performance of the video surveillance system.

In another possible implementation of the first aspect of this application, the first processing result information includes the first similarity information, the second processing result information includes the second similarity information, and the second similarity information is used to indicate the similarity between the to-be-recognized object and the target object in the second image; and the determining, by the analysis unit, third execution result information of the target task based on the first execution result information and the second execution result information includes: separately determining, by the analysis unit, weights of the first similarity information and the second similarity information; and obtaining, by the analysis unit, based on the first similarity information and a weight of the first similarity information, and the second similarity information and a weight of the second similarity information, third similarity information between the target object and the to-be-recognized object. The solutions of this application are refined, so that the solutions of this application are more comprehensive. This improves the feasibility of the embodiments of this application.

In another possible implementation of the first aspect of this application, after the obtaining, by the analysis unit, based on the first similarity information and a weight of the first similarity information, and the second similarity information and a weight of the second similarity information, third similarity information between the target object and the to-be-recognized object, the determining third execution result information of the target task based on the first execution result information and the second execution result information further includes: determining, by the analysis unit, whether the third similarity information meets a second similarity condition; and if the third similarity information meets the second similarity condition, determining, by the analysis unit, that the to-be-recognized object appears in the video surveillance system. The solutions of this application are refined, so that the solutions of this application are more comprehensive. This improves the feasibility of the embodiments of this application.

A second aspect of this application provides a multi-camera collaboration-based video surveillance system, including at least two image obtaining units and an analysis unit. The at least two image obtaining units include a first image obtaining unit and a second image obtaining unit. The first image obtaining unit and the second image obtaining unit are configured to: separately obtain a photographed first image and a photographed second image; obtain indication information of a target task, where the indication information of the target task is used to indicate to process a target object in a photographed image; separately obtain first execution result information and second execution result information of the target task based on the indication information of the target task, where the first execution result information includes first processing result information corresponding to the target object in the first image, and the second execution result information includes second processing result information corresponding to the target object in the second image; and send the first execution result information and the second execution result information to the analysis unit. The analysis unit is configured to determine third execution result information of the target task based on the first execution result information and the second execution result information.

In the video surveillance system provided in this application, an image obtaining units in at least two IPCs may obtain the indication information of the target task, separately obtain different execution result information of the target task based on the indication information of the target task, and then send the obtained execution result information to a device deployed in the analysis unit. The device deployed in the analysis unit may determine the third execution result information of the target task based on the execution result information from the different IPCs. Compared with execution result information that is of the target task and that is obtained by a single IPC, the third execution result information that is of the target task and that is obtained by the video surveillance system in this application through multi-camera collaboration helps reduce a random error to improve reliability of the video surveillance system.

In a possible implementation of the second aspect of this application, the video surveillance system further includes a task allocation unit. Before the first image obtaining unit obtains the indication information of the target task, the task allocation unit is configured to obtain the indication information of the target task, and send the indication information of the target task to the first image obtaining unit. This helps adjust the target task executed by the video surveillance system, and improve the flexibility of the method in this application.

In another possible implementation of the second aspect of this application, after the first image obtaining unit obtains the indication information of the target task, and before the first image obtaining unit obtains the first execution result information of the target task based on the indication information of the target task, the first image obtaining unit is configured to determine whether to accept the target task, and if determining to accept the target task, perform the step of obtaining the first execution result information of the target task based on the indication information of the target task. This helps the image obtaining unit independently select to execute the target task, and helps the video surveillance system more properly allocate the target task.

In another possible implementation of the second aspect of this application, after the task allocation unit obtains the indication information of the target task, the task allocation unit is configured to select the first image obtaining unit from the at least two image obtaining units. This helps the task allocation unit independently select an IPC to execute the target task, and helps the video surveillance system more properly allocate the target task.

In another possible implementation of the second aspect of this application, the task allocation unit is configured to: receive resource information sent by the at least two image obtaining units; and select the first image obtaining unit from the at least two image obtaining units based on the resource information. An optional manner in which the task allocation unit selects the first image obtaining unit from the at least two image obtaining units is provided, to improve feasibility of the solutions of this application.

In another possible implementation of the second aspect of this application, the task allocation unit is further configured to: determine a type of the target task, and determine, based on a pre-established correspondence between a task type and an image obtaining unit, that the target task corresponds to the first image obtaining unit. An optional manner in which the task allocation unit selects the first image obtaining unit from the at least two image obtaining units is provided, to improve feasibility of the solutions of this application.

In another possible implementation of the second aspect of this application, the task allocation unit is further configured to: determine area information corresponding to the target task, and select the first image obtaining unit from the at least two image obtaining units based on the area information. An optional manner in which the task allocation unit selects the first image obtaining unit from the at least two image obtaining units is provided, to improve feasibility of the solutions of this application.

In another possible implementation of the second aspect of this application, after the second image obtaining unit obtains the second image, the second image obtaining unit is further configured to determine whether the second image meets a preset condition, and if the second image meets the preset condition, send initiation information of the target task to the task allocation unit, where the initiation information is used to indicate the task allocation unit to send the indication information of the target task. The task allocation unit is further configured to obtain the indication information of the target task based on the initiation information of the target task. The image obtaining unit in the video surveillance system may be an initiator of the target task, to help initiate the target task based on an actual situation of a surveillance area of the video surveillance system, and improve the flexibility of the method in this application.

In another possible implementation of the second aspect of this application, the second image obtaining unit is further configured to: extract second characteristic information of the target object from the second image; obtain second similarity information, where the second similarity information is used to indicate a similarity between a to-be-recognized object and the target object in the second image; determine whether the second similarity information meets a first similarity condition; and if the second similarity information meets the first similarity condition, determine that the second image meets the preset condition. An optional method for which the second image obtaining unit determines whether the second image meets the preset condition is provided, to help improve the feasibility of the solutions of this application.

In another possible implementation of the second aspect of this application, the first processing result information is related to characteristic information of the target object in the first image, and the second processing result information is related to characteristic information of the target object in the second image. The processing result information is refined, so that the solutions of this application are more comprehensive. This improves the feasibility of the embodiments of this application.

In another possible implementation of the second aspect of this application, the target task is image recognition, and the indication information of the target task includes characteristic information of the to-be-recognized image.

The first image obtaining unit is further configured to: extract first characteristic information of the target object from the first image, and obtain, based on the first characteristic information and the characteristic information of the to-be-recognized image, first similarity information between the to-be-recognized object and the target object in the first image. The solutions of this application are refined, so that the solutions of this application are more comprehensive. This improves the feasibility of the embodiments of this application.

In another possible implementation of the second aspect of this application, the indication information of the target task further includes a third similarity condition. After the first image obtaining unit obtains the first execution result information of the target task based on the indication information of the target task, and before sending the first execution result information to the analysis unit, the first image obtaining unit is further configured to: determine whether the first similarity information meets the third similarity condition, and if the first similarity information meets the third similarity condition, perform the step of sending the first execution result information to the analysis unit. After receiving the indication information of the target task, the image obtaining unit screens the obtained execution result information of the target task, to help reduce a data transmission amount and a data processing amount of the video surveillance system, and further help improve performance of the video surveillance system.

In another possible implementation of the second aspect of this application, the first processing result information includes the first similarity information, the second processing result information includes second similarity information, and the second similarity information is used to indicate the similarity between the to-be-recognized object and the target object in the second image. The analysis unit is further configured to: separately determine weights of the first similarity information and the second similarity information; and obtain, based on the first similarity information and a weight of the first similarity information, and the second similarity information and a weight of the second similarity information, third similarity information between the target object and the to-be-recognized object. The solutions of this application are refined, so that the solutions of this application are more comprehensive. This improves the feasibility of the embodiments of this application.

In another possible implementation of the second aspect of this application, after obtaining, based on the first similarity information and the weight of the first similarity information, and the second similarity information and the weight of the second similarity information, the third similarity information between the target object and the to-be-recognized object, the analysis unit is further configured to: determine whether the third similarity information meets a second similarity condition, and if the third similarity information meets the second similarity condition, determine that the to-be-recognized object appears in the video surveillance system. The solutions of this application are refined, so that the solutions of this application are more comprehensive. This improves the feasibility of the embodiments of this application.

A third aspect of this application provides a computer apparatus. The computer apparatus is configured to:

receive first execution result information and second execution result information of a target task, sent by a first IPC and a second IPC;

determine third execution result information of the target task based on the first execution result information and the second execution result information, where the first execution result information and the second execution result information are separately obtained by the first IPC and the second IPC based on indication information of the target task, the indication information of the target task is used to indicate to process a target object in a photographed image, the first execution result information includes first processing result information corresponding to the target object in an obtained photographed first image, and the second execution result information includes second processing result information corresponding to the target object in an obtained photographed second image.

In a possible implementation of the third aspect of this application, the computer apparatus is further configured to:

obtain the indication information of the target task; and send the indication information of the target task to the first IPC.

In another possible implementation of the third aspect of this application, the computer apparatus is further configured to select the first IPC from at least two IPCs.

In another possible implementation of the third aspect of this application, the computer apparatus is further configured to:

receive resource information sent by the at least two IPCs; and select the first IPC from the at least two IPCs based on the resource information.

In another possible implementation of the third aspect of this application, the computer apparatus is further configured to:

determine a type of the target task; and determine, based on a pre-established correspondence between a task type and an IPC, that the target task corresponds to the first IPC.

In another possible implementation of the third aspect of this application, the computer apparatus is further configured to:

determine area information corresponding to the target task; and select the first IPC from the at least two IPCs based on the area information.

In another possible implementation of the third aspect of this application, the computer apparatus is further configured to:

receive initiation information of, the target task, sent by a second IPC, where the initiation information is used to indicate a task allocation unit to send the indication information of the target task; and obtain the indication information of the target task based on the initiation information of the target task.

In another possible implementation of the third aspect of this application, the first processing result information is related to characteristic information of the target object in the first image, and the second processing result information is related to characteristic information of the target object in the second image.

In another possible implementation of the third aspect of this application, the first processing result information includes first similarity information, and the second processing result information includes second similarity information. The second similarity information is used to indicate a similarity between a to-be-recognized object and the target object in the second image.

The computer apparatus is further configured to:

separately determine weights of the first similarity information and the second similarity information; and obtain, based on the first similarity information and a weight of the first similarity information, and the second similarity information and a weight of the second similarity information, third similarity information between the target object and the to-be-recognized object.

In another possible implementation of the third aspect of this application, the computer apparatus is further configured to:

after obtaining, based on the first similarity information and the weight of the first similarity information, and the second similarity information and the weight of the second similarity information, the third similarity information between the target object and the to-be-recognized object, determine whether the third similarity information meets a second similarity condition, and if the third similarity information meets the second similarity condition, determine that the to-be-recognized object appears in a video surveillance system.

DESCRIPTION OF EMBODIMENTS

Figure 1:
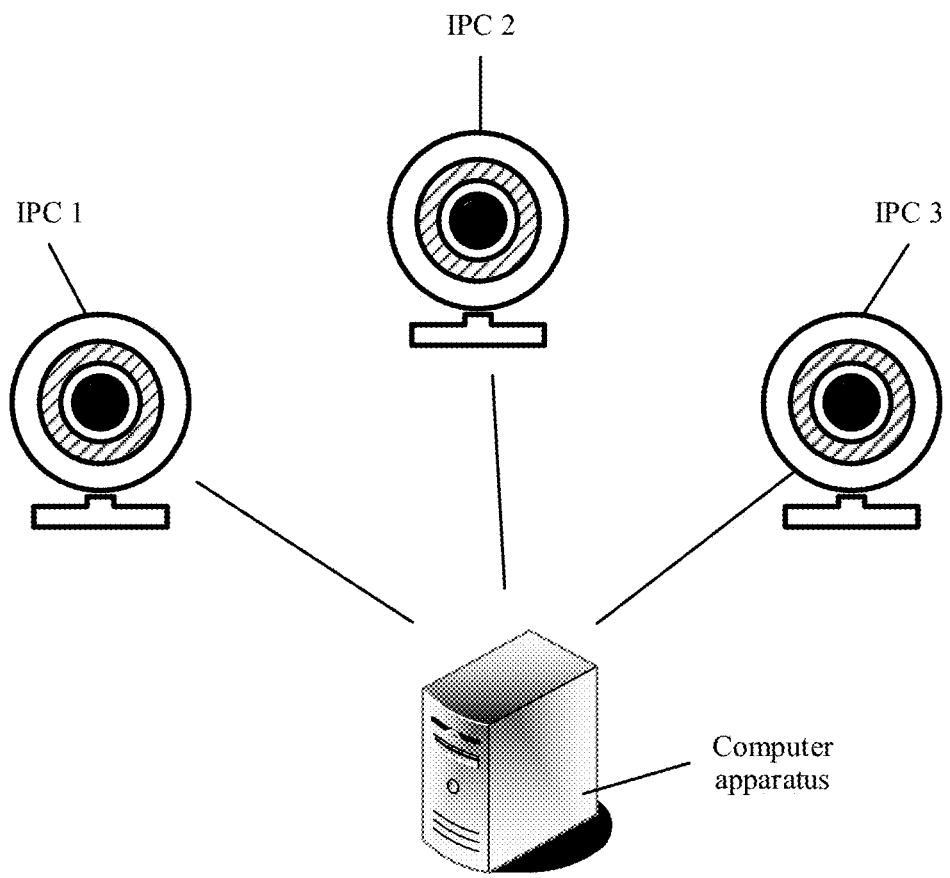
FIG. 1 is a schematic diagram of a possible entity structure of a video surveillance system according to this application.

Embodiments of this application provide a multi-camera collaboration-based image processing method and video surveillance system, to reduce a random error in an intelligent analysis result of the surveillance object obtained by the intelligent video surveillance system, and improve reliability of the intelligent video surveillance system.

The following describes the embodiments of this application with reference to accompanying drawings.

In the specification, claims, and accompanying drawings of this application, the terms "first", "second", and so on are intended to distinguish between similar objects but do not necessarily indicate a specific order or sequence. It should be understood that the terms used in such a way are interchangeable in appropriate circumstances, which is merely a discrimination manner that is used when objects having a same attribute are described in the embodiments of this application. In addition, the terms "include", "contain" and any other variants mean to cover the non-exclusive inclusion, so that a process, method, system, product, or device that includes a series of units is not necessarily limited to those units, but may include other units not expressly listed or inherent to such a process, method, system, product, or device.

Different IPCs have different performance (for example, a difference between hardware or software), and photographing areas of the different IPCs correspond to different environments. Even angles presented by surveillance objects in images photographed by the different IPCs are different. As a result, a specific difference is caused in an intelligent analysis result obtained by the different IPCs in an intelligent video surveillance system. In the existing intelligent video surveillance field, each IPC in the intelligent video surveillance system independently completes intelligent analysis on the surveillance object. An IPC that executes an intelligent analysis task on the surveillance object is usually random. As a result, a specific random error is caused in an intelligent analysis result of the surveillance object obtained by the intelligent video surveillance system. This greatly affects reliability of the intelligent video surveillance system.

Specifically, for example, in an image recognition application, a recognition result is affected by a plurality of environmental factors. Therefore, it is difficult to ensure that the recognition result is stable and highly accurate. Specifically, possible factors in each phase are as follows: In an image collection phase, quality of a collected image is affected by factors such as IPC lens quality, weather, light, dust, and haze. In an object detection phase, a detection result is affected by factors such as a detection algorithm, object blocking, and an object direction. Affected by these factors, a similarity result obtained by comparing the detection result with a reference object usually fluctuates within a specific range. It is difficult to define a universal alarm threshold. This greatly affects usability of the intelligent video surveillance system, and indirectly reduces an actual application value of the intelligent video surveillance system in a security surveillance deployment scenario.

Considering that in an actual application scenario, when appearing in a surveillance deployment area, the surveillance object usually appears in photographing areas of a plurality of IPCs in the intelligent video surveillance system. The different IPCs are deployed at different locations, and are located in the different environments. Even photographing angles for the surveillance object are possibly different. As a result, a specific difference is caused in result information of the surveillance object, obtained after each IPC intelligently analyzes the collected image. In solutions provided in this application, the result information of the surveillance object, obtained by integrating different IPCs is intelligently analyzed to reduce the random error brought by different devices to the result information. This improves the reliability of the intelligent video surveillance system.

This application provides a multi-camera collaboration-based video surveillance system. In an embodiment of a possible entity structure of the system in this application, the video surveillance system may include at least two IPCs and one computer apparatus. The at least two IPCs establish communication connections to the computer apparatus in the video surveillance system. FIG. 1 is a schematic diagram of the possible entity structure of the video surveillance system in this application. In FIG. 1, an example in which the video surveillance system includes three IPCs is used for description.

Figure 2:
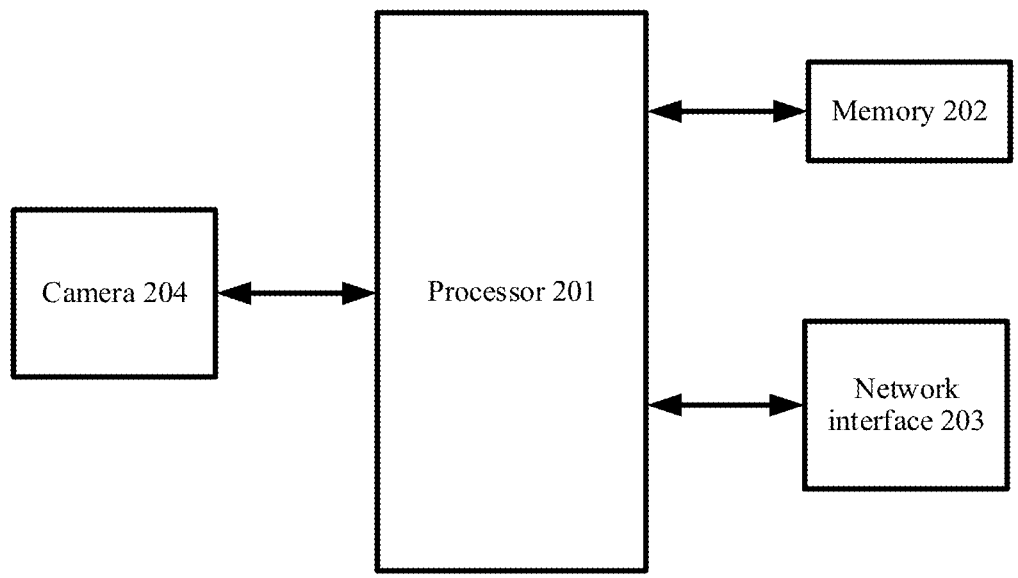
FIG. 2 is a schematic diagram of a structure of an IPC in a video surveillance system according to this application.
Figure 3:
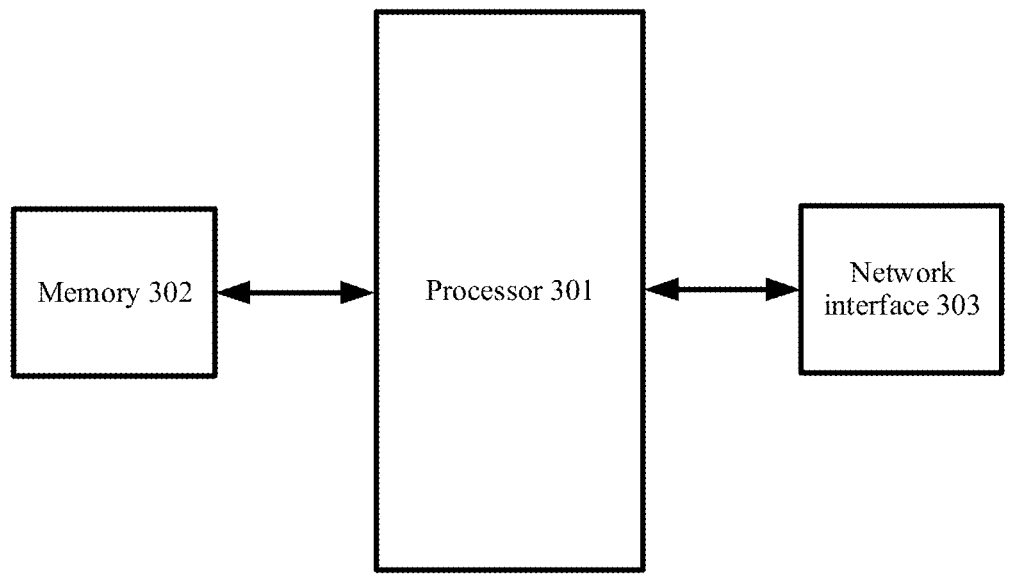
FIG. 3 is a schematic diagram of a structure of a computer apparatus in a video surveillance system according to this application.

Referring to FIG. 2, an IPC in the video surveillance system in this application may include a processor 201, a memory 202, a wired or wireless network interface 203, a camera 204, and a computer program that is stored in the memory 202 and that can run on the processor 201. The computer apparatus in the video surveillance system usually indicates a computer device, such as a server having strong processing power. Referring to FIG. 3, the computer apparatus in the video surveillance system in this application may include a processor 301, a memory 302, a wired or wireless network interface 303, and a computer program that is stored in the memory 302 and that can run on the processor 301.

Structures shown in FIG. 2 and FIG. 3 do not constitute a limitation on the computer apparatus and the IPC in the system in this application. The computer apparatus and the IPC may include more or fewer components than those shown in the figure, combine some components, or have different component arrangements. For example, the computer apparatus may further include an input/output device, a bus, and the like.

The processor may be a central processing unit (Central Processing Unit, CPU), and may further be another general purpose processor, a digital signal processor (DSP), an application-specific integrated circuit (ASIC), a field programmable gate array (Field-Programmable Gate Array, FPGA), or another programmable logic component, a discrete gate, a transistor logic device, or a discrete hardware component. The general purpose processor may be a microprocessor, the processor may be any conventional processor, or the like. The processor is a control center of the computer apparatus, and connects various parts of the entire computer apparatus by using various interfaces and lines. The memory may be configured to store the computer program and/or a module. The processor runs or executes the computer program and/or the module stored in the memory and invokes data stored in the memory, to implement various functions of the computer apparatus.

The memory may mainly include a program storage area and a data storage area. The program storage area may store an operating system, an application program required by at least one function (such as a sound playing function, and an image playing function), and the like. The data storage area may store data (such as audio data and a phone book) created based on use of a mobile phone, and the like. In addition, the memory may include a high-speed random access memory, and may further include a nonvolatile memory, for example, a hard disk, a memory, a plug-connected hard disk, a smart media card (Smart Media Card, SMC), a secure digital (Secure Digital, SD) card, a flash card (Flash Card), at least one magnetic disk storage device, a flash memory device, or another volatile solid-state storage device.

When a module/unit integrated in the IPC or the computer apparatus in the system of this application is implemented in a form of a software functional unit and sold or used as an independent product, the module/unit may be stored in a computer-readable storage medium. Based on such an understanding, all or some of the processes of the method in the embodiments of the present invention may be implemented by a computer program instructing related hardware. The computer program may be stored in the computer-readable storage medium. When the computer program is executed by the processor, steps of the foregoing method embodiment may be implemented. The computer program includes computer program code. The computer program code may be in a source code form, in an object code form, in an executable file form, some intermediate forms, or the like. The computer-readable medium may include any entity or apparatus that can carry the computer program code, a recording medium, a USB flash drive, a removable hard disk, a magnetic disk, a compact disc, a computer memory, a read-only memory (ROM, Read-Only Memory), a random access memory (RAM, Random Access Memory), an electrical carrier signal, a telecommunication signal, a software distribution media, and the like. It should be noted that content included in the computer-readable medium may be appropriately added or deleted based on requirements of legislation and patent practice in a jurisdiction. For example, in some jurisdictions, according to the legislation and the patent practice, the computer-readable medium does not include an electrical carrier signal or a telecommunication signal.

Figure 4:
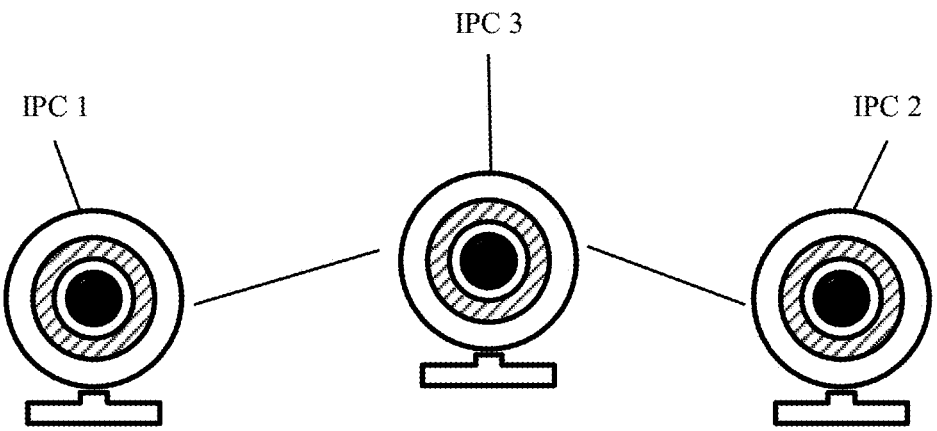
FIG. 4 is a schematic diagram of another possible entity structure of a video surveillance system according to this application.

In another possible entity embodiment of the system in this application, the video surveillance system may include at least two IPCs. A communication connection is established between the at least two IPCs in the video surveillance system. FIG. 4 is a schematic diagram of another possible entity structure of the video surveillance system in this application. In FIG. 4, an example in which the video surveillance system includes three IPCs is used for description. An IPC 3 establishes a communication connection to an IPC 1, and an IPC 2 establishes a communication connection to the IPC 3. For an entity structure of an IPC in the video surveillance system corresponding to FIG. 4, refer to the embodiment corresponding to FIG. 2. Details are not described herein again.

A specific computer program is stored in a storage unit on each entity device in the video surveillance system, so that each device in the video surveillance system can implement a specific function corresponding to the stored computer program. Further, a plurality of devices in the video surveillance system in this application collaboratively execute a target task, to help reduce a random error in processing result information of the target task due to different IPCs. This improves reliability of the intelligent video surveillance system. The following describes running of a video surveillance system in this application in a form of a software functional unit.

Figure 5:
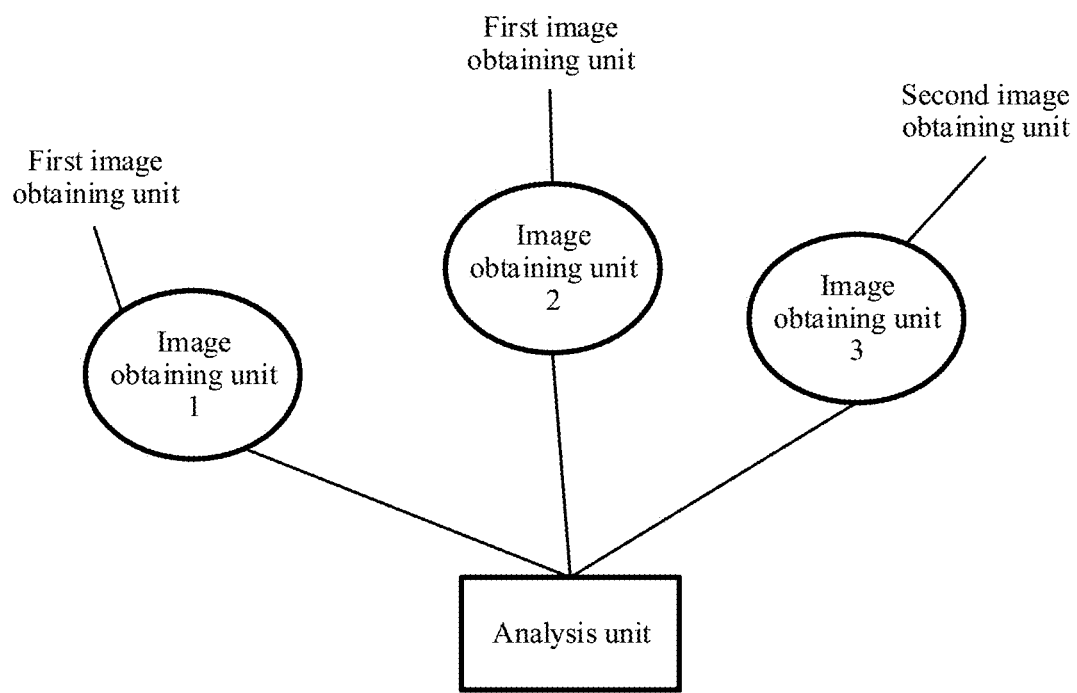
FIG. 5 is a schematic diagram of a possible functional structure of a video surveillance system according to this application.

In a possible functional structure embodiment of the system in this application, the video surveillance system may include at least two image obtaining units and an analysis unit. The at least two image obtaining units establish communication connections to the analysis unit. The image obtaining unit is deployed in an IPC, and different image obtaining units are deployed in different IPCs. For ease of description, it is assumed that the at least two image obtaining units include a first image obtaining unit and a second image obtaining unit. It should be noted that the first image obtaining unit and the second image obtaining unit are configured to indicate different image obtaining units, but a quantity of indicated image obtaining units is not limited. In other words, the first image obtaining unit may indicate at least one image obtaining unit. Likewise, the second image obtaining unit may indicate at least one image obtaining unit. FIG. 5 is a schematic diagram of a possible functional structure of the system in this application. In FIG. 5, an example in which the video surveillance system includes three image obtaining units is used. It is assumed that an image obtaining unit 1 and an image obtaining unit 2 correspond to the first image obtaining unit, and an image obtaining unit 3 corresponds to the second image obtaining unit. The following describes functions of functional units in the video surveillance system corresponding to FIG. 5.

In a running process of the system in this application, the first image obtaining unit and the second image obtaining unit may photograph an image. It is assumed that the first image obtaining unit obtains a first photographed image, and the second image obtaining unit obtains a second photographed image. In addition, the first image obtaining unit and the second image obtaining unit may obtain indication information of a target task. The indication information of the target task is used to indicate to process a target object in a photographed image.

The image in this embodiment of this application is the image obtained by the image obtaining unit through photographing. Therefore, the target object in the image corresponds to an entity in reality, and may be a specific and unique entity, for example, a person, or may be a type of entity, for example, the human. The first image obtaining unit and the second image obtaining unit may first recognize the target object in the image. For example, recognizing the target object in the image may indicate that the first image obtaining unit and the second image obtaining unit can determine whether the image includes the target object. Further, if determining that the image includes the target object, the first image obtaining unit and the second image obtaining unit can determine information about an image area corresponding to the target object in the image. The information about the image area corresponds to existence of the target object in the image. The information about the image area may be referred to as the target object in the image. For implementation of recognizing the target object in the image by the image obtaining unit, for example, the indication information of the target task may include a recognition algorithm for the target object. The first image obtaining unit and the second image obtaining unit may recognize the target object in the image through the recognition algorithm in the indication information of the target task. Alternatively, the recognition algorithm for the target object may be prestored in the first image obtaining unit and the second image obtaining unit. Recognition algorithms for different target objects correspond to different identification information. For example, identification information of a facial recognition algorithm is a recognition algorithm 1, and identification information of a license plate recognition algorithm is a recognition algorithm 2. The indication information of the target task may include identification information of the recognition algorithm for the target object, to indicate the image obtaining unit to determine the recognition algorithm for the target object from a locally stored recognition algorithm and recognize the target object in the image through the determined recognition algorithm. Although both the first image obtaining unit and the second image obtaining unit need to recognize the target object in the image, even if the first image obtaining unit and the second image obtaining unit use the same recognition algorithm for the target object, the target objects in the first image and the second image usually have a specific difference because a photographing angle, ambient light, and other factors are different when different image obtaining units photograph entities corresponding to the target object.

After obtaining the indication information of the target task, the first image obtaining unit and the second image obtaining unit may execute the target task. Specifically, the first image obtaining unit may obtain a first execution result information of the target task based on the indication information of the target task. The first execution result information includes first processing result information corresponding to the target object in the first image. The second image obtaining unit may obtain second execution result information of the target task based on the indication information of the target task. The second execution result information includes second processing result information corresponding to the target object in the second image. Then, the first image obtaining unit and the second image obtaining unit may send the first execution result information and the second execution result information to the analysis unit. After receiving the first execution result information and the second execution result information, the analysis unit may determine third execution result information of the target task based on the first execution result information and the second execution result information.

The following describes a system entity structure on which a functional system embodiment corresponding to FIG. 5 is based.

(1) The system corresponding to FIG. 5 may be based on the entity structure embodiment corresponding to FIG. 1. In this case, the image obtaining unit may be deployed in an IPC in the embodiment corresponding to FIG. 1. For example, the image obtaining unit 1, the image obtaining unit 2, and the image obtaining unit 3 in FIG. 5 may be respectively deployed in the IPC 1, the IPC 2, and the IPC 3 in FIG. 1. The analysis unit may be deployed in the computer apparatus in the embodiment corresponding to FIG. 1. The computer apparatus may obtain, through communication connections established with at least two IPCs, execution result information of the target task performed by the at least two IPCs.

(2) the system corresponding to FIG. 5 may be based on the entity structure embodiment corresponding to FIG. 4. In this case, the image obtaining unit may be deployed in an IPC in the embodiment corresponding to FIG. 4. For example, the image obtaining unit 1, the image obtaining unit 2, and the image obtaining unit 3 in FIG. 5 may be respectively deployed in the IPC 1, the IPC 2, and the IPC 3 in FIG. 1. The analysis unit may be deployed in the IPC 3 in the embodiment corresponding to FIG. 4. It should be noted that, when the analysis unit is deployed in the IPC 3 in the embodiment corresponding to FIG. 4, there may be a plurality of specific deployment forms. For example, the analysis unit may be deployed inside the IPC 3 in FIG. 4, the analysis unit may be integrated with an image obtaining unit 3 in the IPC 3. The analysis unit may obtain execution result information of the target task, obtained by the image obtaining unit 3, and may obtain execution result information, of the target task, sent by another IPC (for example, the IPC 1 and the IPC 2) and received by the IPC 3. Alternatively, the analysis unit may be deployed outside the IPC 3 in FIG. 4, for example, deployed in a computer apparatus (not shown in FIG. 4). The computer apparatus (not shown in FIG. 4) establishes a communication connection to the IPC 3. The computer apparatus (not shown in FIG. 4) can receive the execution result information of the target task, obtained by the IPC 3 based on the indication information of the target task. The IPC 3 can forward, to the computer apparatus (not shown in FIG. 4), the received execution result information, of the target task, sent by the another IPC (for example, the IPC 1 and the IPC 2). It can be learned that the IPC 3 can obtain, through only a communication connection established with at least one IPC, the execution result information of the target task performed by the at least two IPCs (including the image obtaining unit 3 deployed in the IPC 3).

Figure 6:
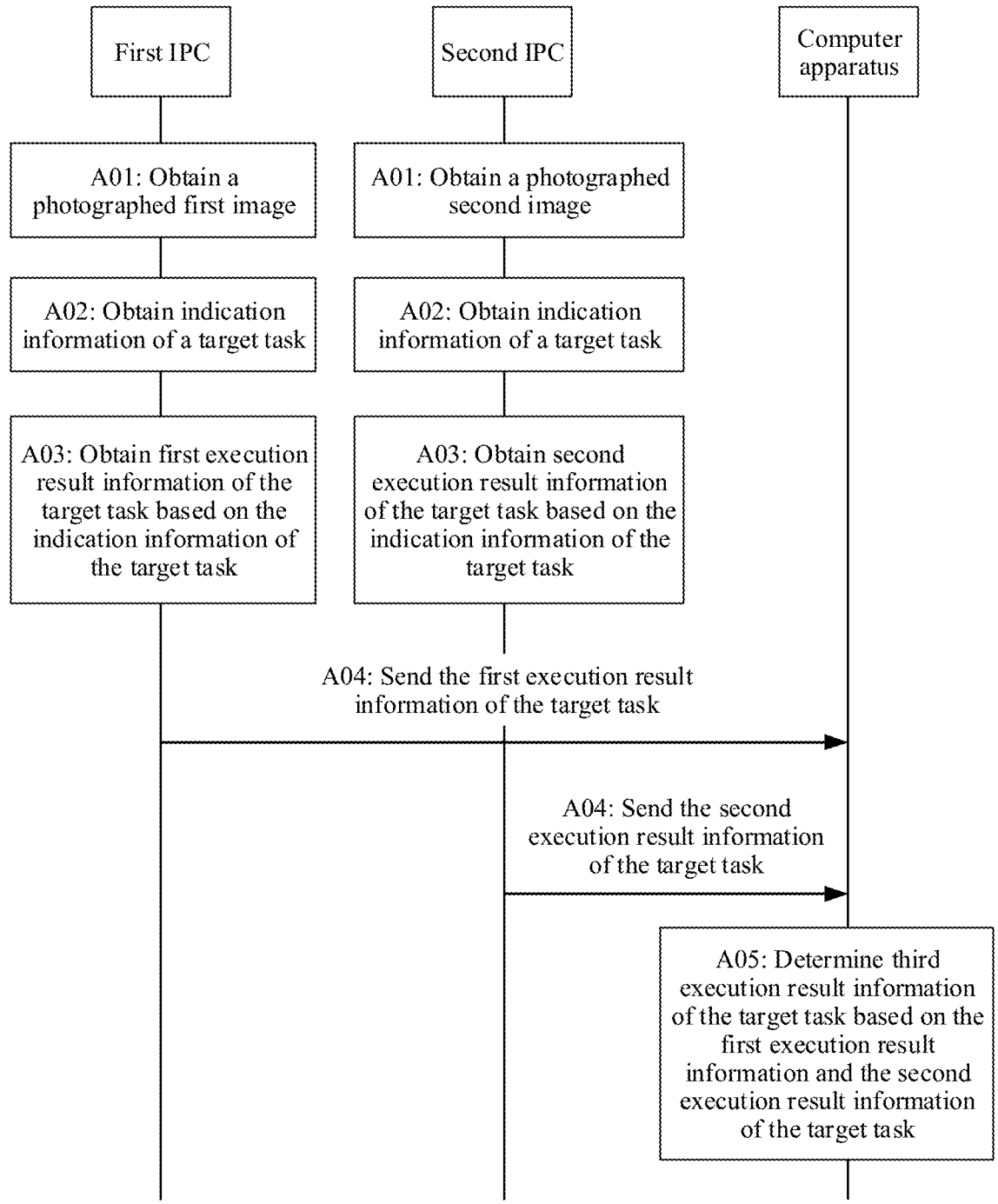
FIG. 6 is a schematic diagram of an embodiment of an image processing method according to this application.

Based on a case in which the system corresponding to FIG. 5 is based on the entity structure embodiment corresponding to FIG. 1, for example, the following provides an embodiment of the image processing method in this application. Referring to FIG. 6, the embodiment of the image processing method in this application includes:

A01: A first IPC and a second IPC separately obtain a photographed first image and a photographed second image.

A02: The first IPC and the second IPC obtain indication information of a target task.

A03: The first IPC and the second IPC separately obtain first execution result information and second execution result information of the target task based on the indication information of the target task.

A04: The first IPC and the second IPC send the first execution result information and the second execution result information to a computer apparatus.

A05: The computer apparatus determines third execution result information of the target task based on the first execution result information and the second execution result information.

Figure 7:
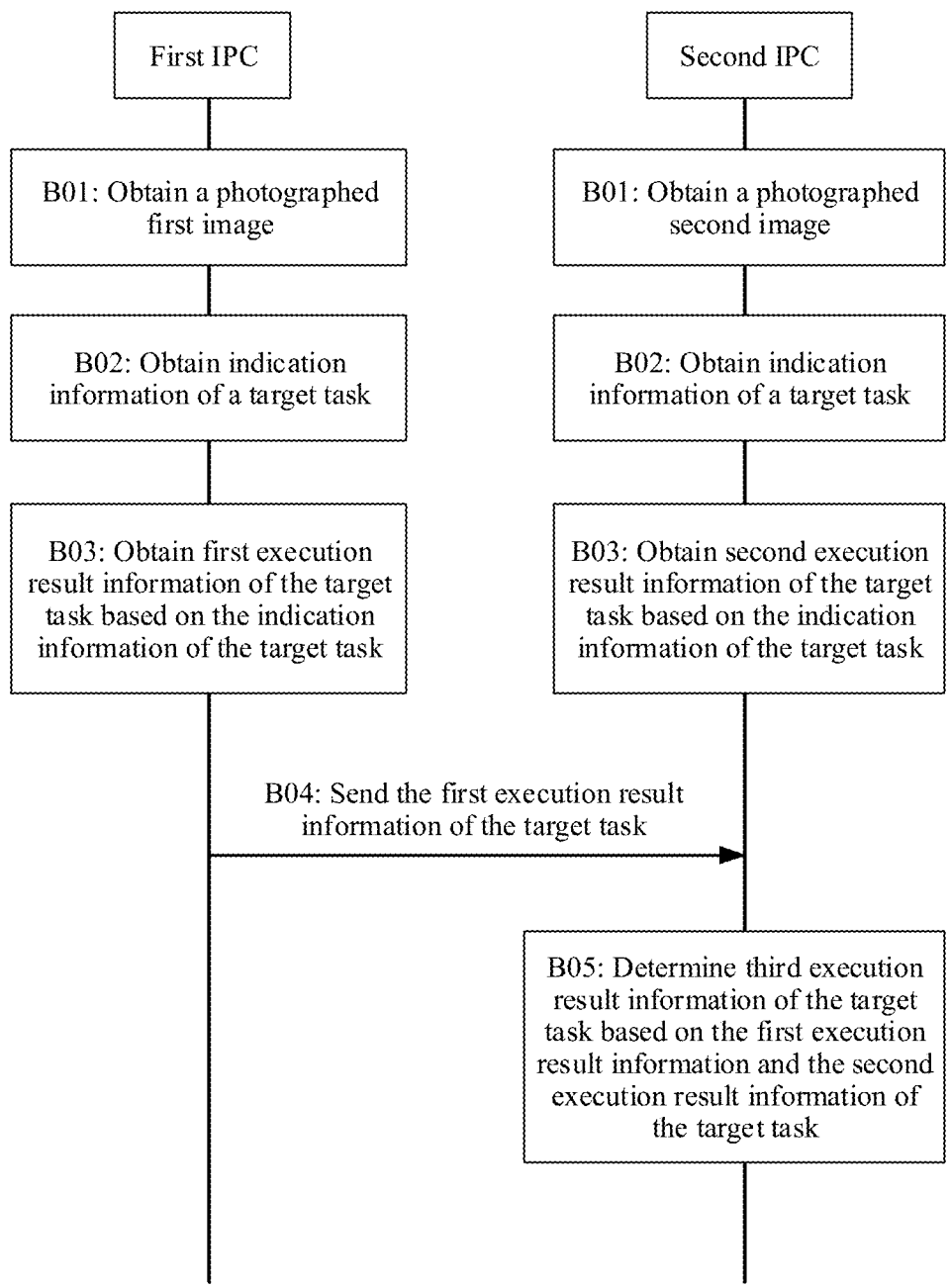
FIG. 7 is a schematic diagram of another embodiment of an image processing method according to this application.

Based on a case in which the system corresponding to FIG. 5 is based on the entity structure embodiment corresponding to FIG. 4, for example, the following provides another embodiment of the image processing method in this application. Referring to FIG. 7, the another embodiment of the image processing method in this application includes:

B01: A first IPC and a second IPC separately obtain a photographed first image and a photographed second image.

B02: The first IPC and the second IPC obtain indication information of a target task.

B03: The first IPC and the second IPC separately obtain first execution result information and second execution result information of the target task based on the indication information of the target task.

B04: The first IPC sends the first execution result information to the second IPC.

B05: The second IPC determines third execution result information of the target task based on the first execution result information and the second execution result information.

It can be learned from the embodiments corresponding to FIG. 5 to FIG. 7 that in the video surveillance system provided in this application, the at least two IPCs may obtain the indication information of the target task, and separately obtain different execution result information of the target task based on the indication information of the target task. Then, the at least two IPCs may send the execution result information obtained by each of the at least two IPCs to a device deployed in the analysis unit. The device deployed in the analysis unit may determine the third execution result information of the target task based on the execution result information from the different IPCs. Compared with execution result information that is of the target task and that is obtained by a single IPC, the third execution result information that is of the target task and that is obtained by the video surveillance system in this application through multi-camera collaboration helps reduce a random error to improve reliability of the video surveillance system.

Figure 8:
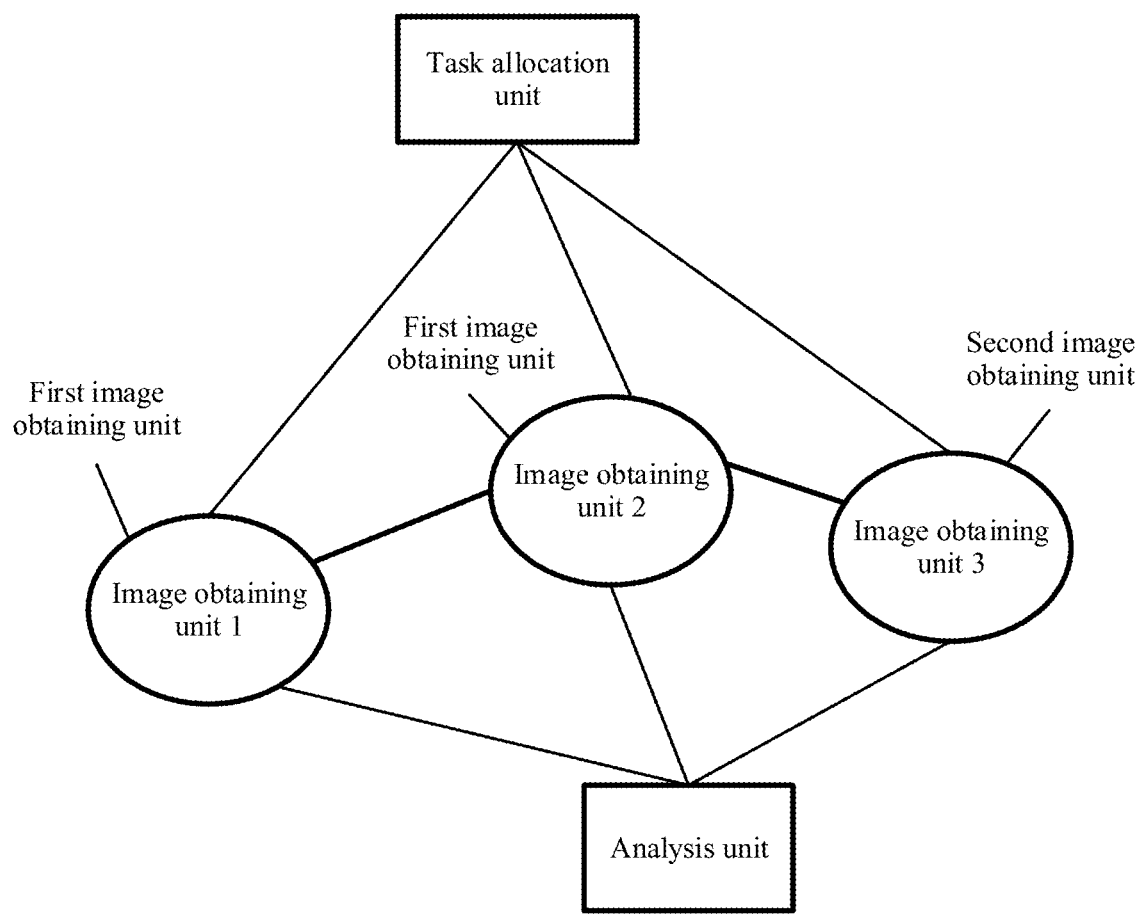
FIG. 8 is a schematic diagram of another possible functional structure of a video surveillance system according to this application.

In the functional structure embodiment corresponding to FIG. 5, the indication information of the target task, obtained by the image obtaining unit may be preconfigured in a storage unit of the IPC, or may be received from a task allocation unit. Based on the functional structure embodiment corresponding to FIG. 5, FIG. 8 is two optional schematic diagrams of another possible functional structure embodiment of the system in this application. In the another possible functional structure embodiment of the system in this application, in addition to at least two image obtaining units and an analysis unit, the video surveillance system further includes a task allocation unit. The at least two image obtaining units establish communication connections to the analysis unit, and the at least two image obtaining units also establish communication connections to the task allocation unit. For specific descriptions of an image obtaining unit, refer to the embodiment corresponding to FIG. 5. Details are not described herein again. In FIG. 8, an example in which the video surveillance system includes three image obtaining units is used. It is assumed that an image obtaining unit 1 and an image obtaining unit 2 correspond to the first image obtaining unit, and an image obtaining unit 3 corresponds to the second image obtaining unit. The following describes functions of functional units in the video surveillance system corresponding to FIG. 8.

In another running process of the system in this application, the functions that can be implemented by the first image obtaining unit, the second image obtaining unit, and the analysis unit in the embodiment corresponding to FIG. 8 include the functions of corresponding units in the embodiment corresponding to FIG. 5. Details are not described herein again. In the embodiment corresponding to FIG. 8, the video surveillance system further includes the task allocation unit. The task allocation unit can obtain the indication information of the target task, and then may send the indication information of the target task to the image obtaining unit. For example, the task allocation unit may send the indication information of the target task to the first image obtaining unit. The first image obtaining unit may receive the indication information, of the target task, sent by the task allocation unit.

Optionally, the task allocation unit may send the indication information of the target task to the second image obtaining unit. The second image obtaining unit may receive the indication information, of the target task, sent by the task allocation unit. Alternatively, optionally, the second image obtaining unit may obtain the indication information of the target task without the task allocation unit sending the indication information. For example, the second image obtaining unit may be an initiator of the target task. For example, the second image obtaining unit may determine whether the second image meets a preset condition. If the second image meets the preset condition, the second image obtaining unit sends initiation information of the target task to the task allocation unit. The initiation information is used to indicate the task allocation unit to send the indication information of the target task. In this case, optionally, when the second image obtaining unit determines that the second image meets the preset condition, the second image obtaining unit may obtain the indication information of the target task. In this case, the task allocation unit may not send the indication information to the second image obtaining unit. In actual use, only one specified IPC or some specified IPCs in the video surveillance system may have a function of the initiator, or all IPCs in the video surveillance system may have a function of the initiator.

In addition to that the target task is automatically initiated by the second image obtaining unit, optionally, the target task may further be released by an administrator of the video surveillance system to the task allocation unit. For example, when the administrator learns about an exact message, and when the target object appears in a surveillance deployment area, the administrator may import the indication information of the target task into the task allocation unit. Then, the task allocation unit releases the indication information of the target task to an image obtaining unit in each IPC in the surveillance deployment area.

The following describes an entity structure on which the functional structure embodiment of the system corresponding to FIG. 8 is based.

(1) The system corresponding to FIG. 8 may be based on the entity structure embodiment corresponding to FIG. 1. In this case, the image obtaining unit in the embodiment corresponding to FIG. 8 may be deployed in an IPC in the embodiment corresponding to FIG. 1. For example, the image obtaining unit 1, the image obtaining unit 2, and the image obtaining unit 3 in FIG. 8 may be respectively deployed in the IPC 1, the IPC 2, and the IPC 3 in FIG. 1. Both the analysis unit and the task allocation unit in the embodiment corresponding to FIG. 8 may be deployed in the computer apparatus in the embodiment corresponding to FIG. 1. Specifically, the analysis unit and the task allocation unit may be deployed in a same computer apparatus, or may be deployed in different computer apparatuses. The computer apparatus in the embodiment corresponding to FIG. 1 may send the indication information of the target task to the at least two IPCs through communication connections to the at least two IPCs. The computer apparatus may obtain the execution result information of the target task, returned by the at least two IPCs.

(2) The system corresponding to FIG. 8 may be based on the entity structure embodiment corresponding to FIG. 4. In this case, the image obtaining unit in the embodiment corresponding to FIG. 8 may be deployed in an IPC in the embodiment corresponding to FIG. 1. For example, the image obtaining unit 1, the image obtaining unit 2, and the image obtaining unit 3 in FIG. 8 may be respectively deployed in the IPC 1, the IPC 2, and the IPC 3 in FIG. 4. Both the analysis unit and the task allocation unit in the embodiment corresponding to FIG. 8 may be deployed in the same IPC in the embodiment corresponding to FIG. 4. Based on the example in FIG. 1, both the analysis unit and the task allocation unit may be deployed in the IPC 3. It should be noted that when both the analysis unit and the task allocation unit are deployed in the IPC 3, there may be a plurality of specific deployment forms. For details, refer to corresponding descriptions in the embodiment corresponding to FIG. 5. Details are not described herein again. The task allocation unit may send the indication information of the target task to the image obtaining unit 3 in the IPC 3, and the analysis unit may receive the execution result information, of the target task, sent by the image obtaining unit 3 in the IPC 3. Therefore, the IPC 3 only needs to establish a communication connection to the at least one IPC, to send the execution result information of the target task to the at least two IPCs (including the image obtaining unit 3 deployed in the IPC 3), and obtain the execution result information of the target task performed by the at least two IPCs (including the image obtaining unit 3 deployed in the IPC 3).

Figure 9:
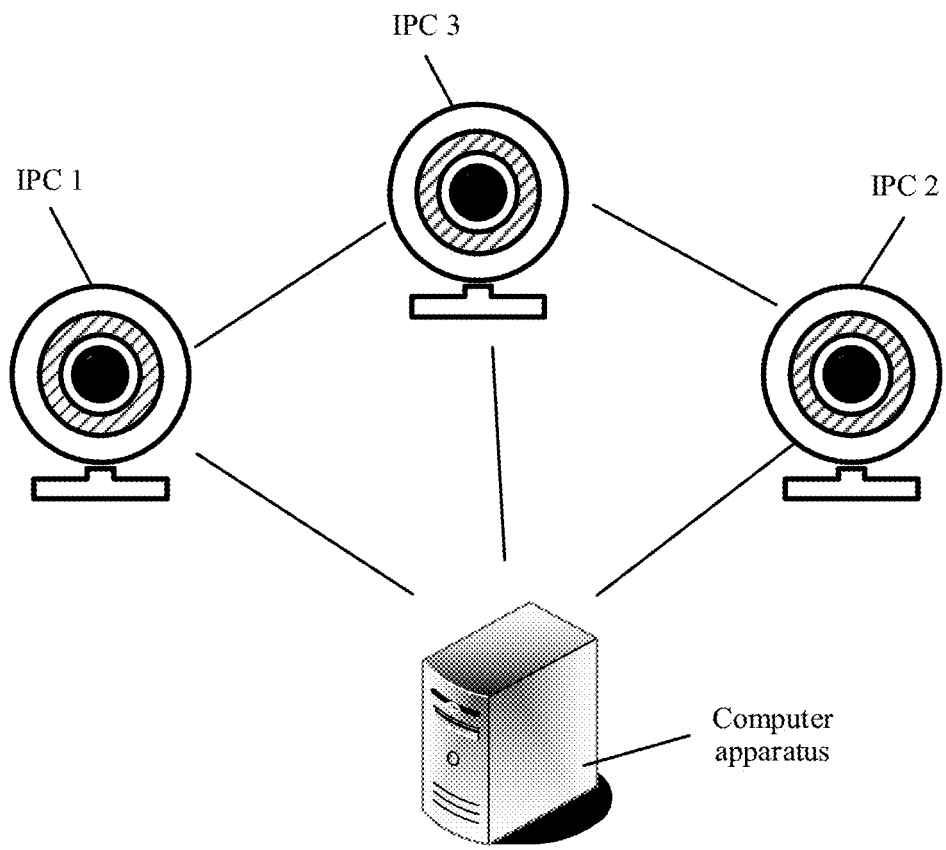
FIG. 9 is a schematic diagram of another possible entity structure of a video surveillance system according to this application.

(3) Referring to FIG. 9, in another possible entity embodiment of the system in this application, the video surveillance system may include at least two IPCs and a computer apparatus. In FIG. 9, an example in which the video surveillance system includes three IPCs is used for description. The computer apparatus establishes communication connections to the at least two IPCs, and at least one target IPC establishes a communication connection to at least one other IPC, to ensure that communication connections are established between the at least two IPCs that establish the communication connection to the computer apparatus and the target IPC (if the at least two IPCs that establish the communication connection to the computer apparatus include the target IPC, only one IPC needs to be capable of establishing the communication connection to the target IPC). In FIG. 9, an example in which an IPC 3 is the target IPC is used. The system corresponding to FIG. 8 may be based on the entity structure embodiment corresponding to FIG. 9. In this case, the image obtaining unit in the embodiment corresponding to FIG. 8 may be deployed in an IPC in the embodiment corresponding to FIG. 9. For example, the image obtaining unit 1, the image obtaining unit 2, and the image obtaining unit 3 in FIG. 8 may be respectively deployed in an IPC 1, an IPC 2, and the IPC 3 in FIG. 9. The task allocation unit may be deployed in the computer apparatus in the embodiment corresponding to FIG. 9. The analysis unit may be deployed in the target IPC. For example, the analysis unit may be deployed in the IPC 3 in FIG. 9. Alternatively, the task allocation unit may be deployed in the target IPC in the embodiment corresponding to FIG. 9. For example, the task allocation unit may be deployed in the IPC 3 in FIG. 9, and the analysis unit may be deployed in the computer apparatus in the embodiment corresponding to FIG. 9.

Figure 10:
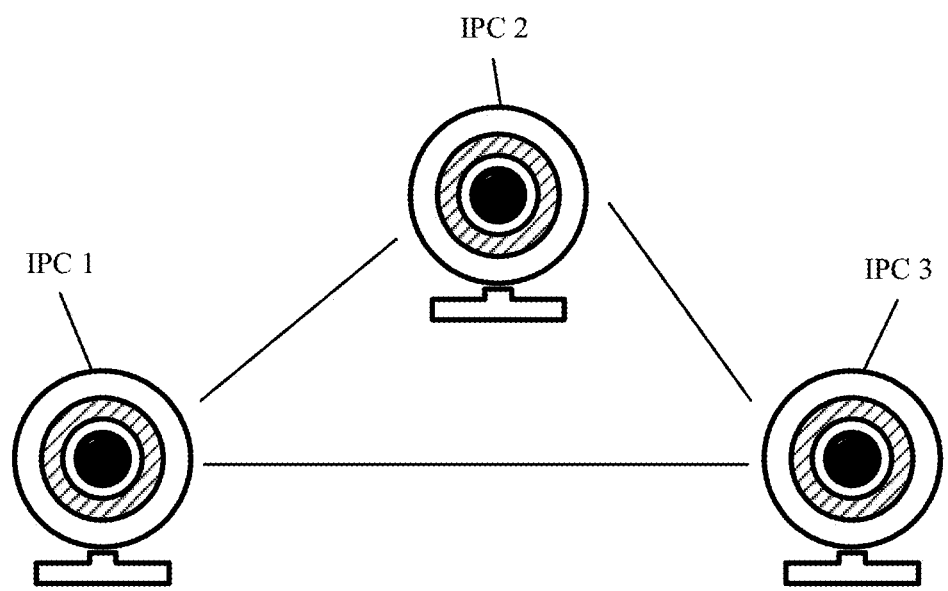
FIG. 10 is a schematic diagram of another possible entity structure of a video surveillance system according to this application.

(4) Referring to FIG. 10, in another possible entity embodiment of the system in this application, the video surveillance system may include at least two IPCs. In FIG. 10, an example in which the video surveillance system includes three IPCs is used for description. At least one first target IPC establishes a communication connection to at least one other IPC, and at least one second target IPC establishes a communication connection to the at least one other IPC. If the first target IPC can establish a communication connection to the second target IPC, both the first target IPC and the second target IPC can establish communication connections to the at least one same other IPC; or if the first target IPC does not establish a communication connection to the second target IPC, both the first target IPC and the second target IPC can establish communication connections to at least two same other IPCs. In FIG. 10, it is assumed that an IPC 1 is the first target IPC, and an IPC 2 is the second target IPC. The system corresponding to FIG. 8 may be based on the entity structure embodiment corresponding to FIG. 10. In this case, the image obtaining unit in the embodiment corresponding to FIG. 8 may be deployed in the IPC in the embodiment corresponding to FIG. 10. For example, the image obtaining unit 1, the image obtaining unit 2, and the image obtaining unit 3 in FIG. 8 may be respectively deployed in the IPC 1, the IPC 2, and an IPC 3 in FIG. 10. The task allocation unit may be deployed in the first target IPC (for example, the IPC 1 in FIG. 10) in the embodiment corresponding to FIG. 10. The analysis unit may be deployed in the second target IPC (for example, the IPC 2 in FIG. 10).

Figure 11:
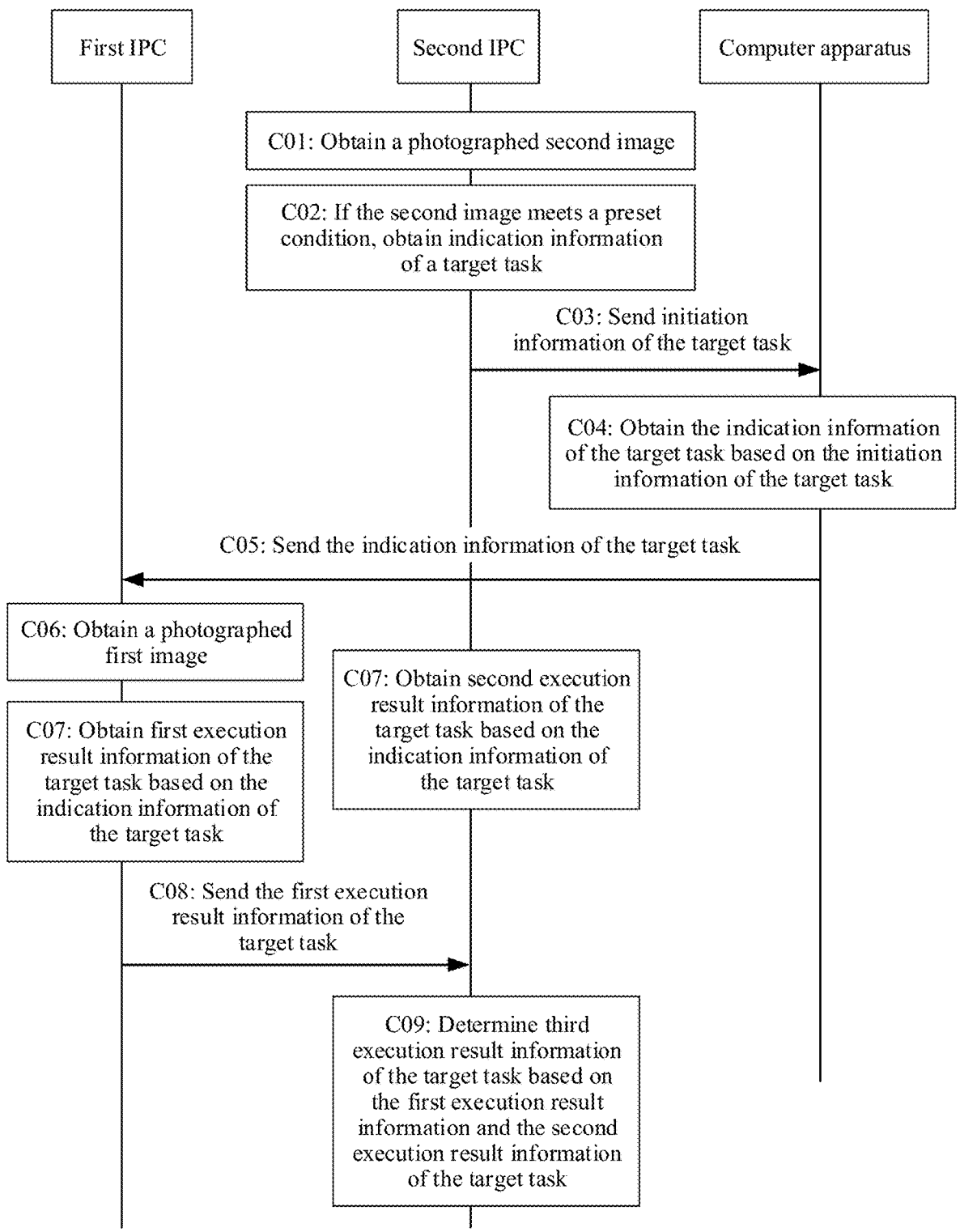
FIG. 11 is a schematic diagram of another embodiment of an image processing method according to this application.

Based on a case in which the system corresponding to FIG. 8 is based on the entity structure embodiment corresponding to FIG. 9, specifically, it is assumed that the task allocation unit is deployed in the computer apparatus in the embodiment corresponding to FIG. 9, and the analysis unit is deployed in the second IPC (namely, the IPC 3 in FIG. 9). For example, the following provides another embodiment of an image processing method in this application. Referring to FIG. 11, the another embodiment of the image processing method in this application includes:

C01: A second IPC obtains a photographed second image.

C02: If the second image meets a preset condition, a second image obtaining unit determines indication information of a target task.

C03: The second image obtaining unit sends initiation information of the target task to a computer apparatus.

C04: The computer apparatus obtains the indication information of the target task based on the initiation information of the target task.

C05: The computer apparatus sends the indication information of the target task to a first image obtaining unit.

C06: A first IPC obtains a photographed first image.

C07: The first IPC and the second IPC separately obtain first execution result information and second execution result information of the target task based on the indication information of the target task.

C08: The first IPC sends the first execution result information to the second IPC.

C09: The second IPC determines third execution result information of the target task based on the first execution result information and the second execution result information.

Figure 12:
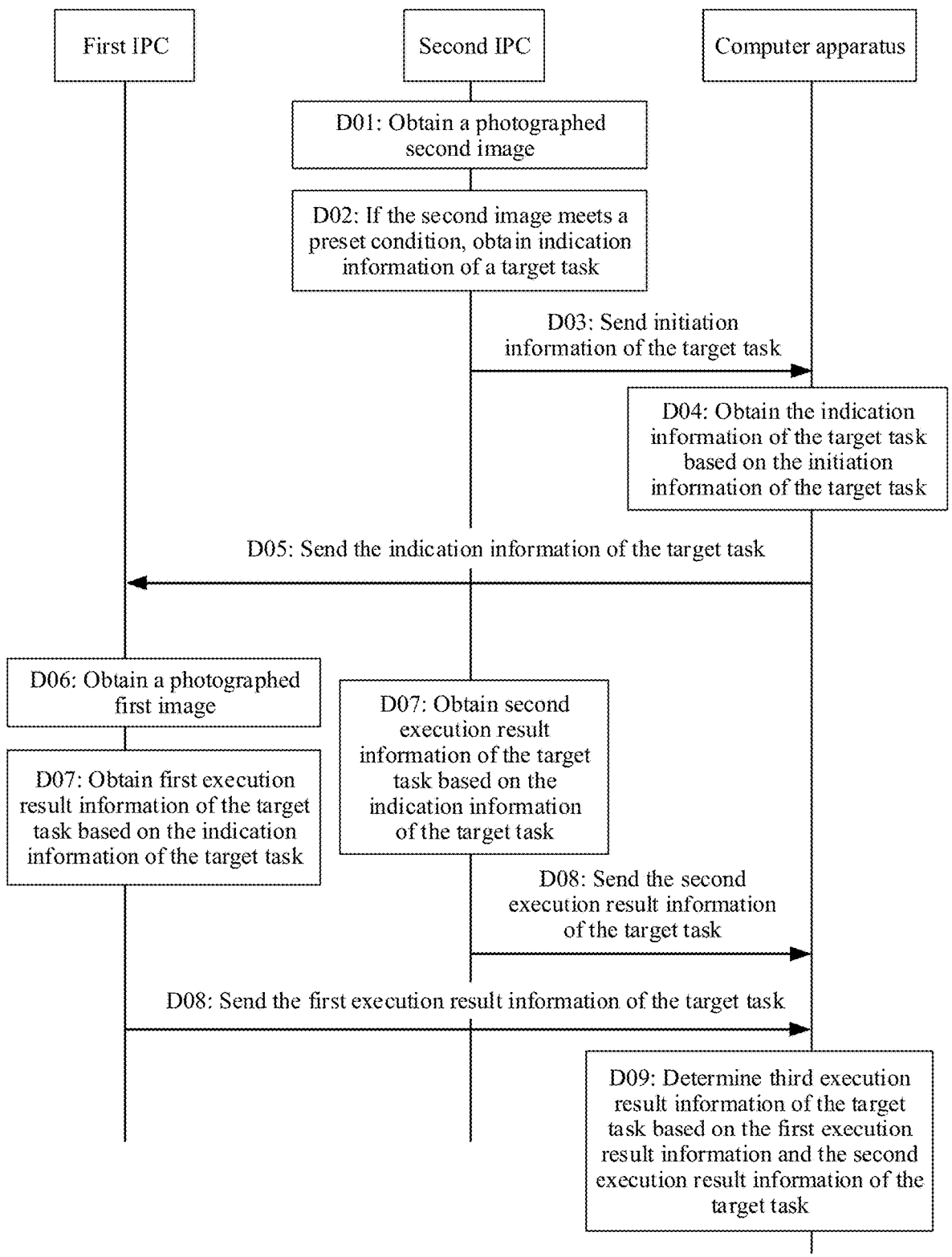
FIG. 12 is a schematic diagram of another embodiment of an image processing method according to this application.

Based on a case in which the system corresponding to FIG. 8 is based on the entity structure embodiment corresponding to FIG. 1, specifically, it is assumed that both the task allocation unit and the analysis unit are deployed in the computer apparatus in the embodiment corresponding to FIG. 1. For example, the following provides another embodiment of the image processing method in this application. Referring to FIG. 12, the another embodiment of the image processing method in this application includes:

D01: A second IPC obtains a photographed second image.

D02: If the second image meets a preset condition, a second image obtaining unit determines indication information of a target task.

D03: The second image obtaining unit sends initiation information of the target task to a computer apparatus.

D04: The computer apparatus obtains the indication information of the target task based on the initiation information of the target task.

D05: The computer apparatus sends the indication information of the target task to a first image obtaining unit.

D06: A first IPC obtains a photographed first image.

D07: The first IPC and the second IPC separately obtain first execution result information and second execution result information of the target task based on the indication information of the target task.

D08: The first IPC and the second IPC send the first execution result information and the second execution result information to the computer apparatus.

D09: The computer apparatus determines third execution result information of the target task based on the first execution result information and the second execution result information.

It can be learned from the embodiment corresponding to FIG. 8 that, in the video surveillance system provided in this application, the task allocation unit may send the obtained indication information of the target task to the IPC, to indicate the IPC to obtain the execution result information of the target task based on the indication information of the target task, and send the obtained execution result information to a device deployed in the analysis unit. The video surveillance system can control an occasion for executing the target task by controlling a moment for sending the indication information of the target task by the task allocation unit, or setting, in the indication information, a moment for executing the target task. A process in which the video surveillance system executes the target task can be changed, or a type of the task executed by the video surveillance system can be changed by adjusting content of the indication information sent by the task allocation unit. The IPC in the video surveillance system, namely, an executor of the target task to execute the target task, can be controlled by adjusting an object for sending the indication information of the target task by the task allocation unit. It can be learned that the embodiment corresponding to FIG. 8 helps improve flexibility of a multi-camera collaboration process in the video surveillance system.

In the embodiment corresponding to FIG. 8, optionally, some or all of the image obtaining units that receive the indication information of the target task can choose whether to accept the target task. The first image obtaining unit is used as an example. After the first image obtaining unit obtains the indication information of the target task, and before the first image obtaining unit obtains the first execution result information of the target task based on the indication information of the target task, the first image obtaining unit may further determine whether to accept the target task. If the first image obtaining unit accepts the target task, the first image obtaining unit may perform the step of obtaining the first execution result information of the target task based on the indication information of the target task. For example, the first image obtaining unit may determine, based on resource information, whether to accept the target task. For example, the first image obtaining unit determines, based on an algorithm capability and a current resource status of a deployed IPC, to accept the target task.

In the embodiment corresponding to FIG. 8, optionally, after obtaining the indication information of the target task, the task allocation unit may select the object for sending the indication information of the target task. In other words, the task allocation unit selects the IPC in the video surveillance system to execute the target task. The following describes a method for selecting the sending object by the task allocation unit. That the sending object selected by the task allocation unit includes the first image obtaining unit is used as an example. In other words, after the task allocation unit obtains the indication information of the target task and before the task allocation unit sends the indication information of the target task to the first image obtaining unit, the task allocation unit may select the first image obtaining unit from at least two image obtaining units. For example, the following provides several selection processes:

(1) The at least two image obtaining units may send the resource information, for example, the algorithm capability or the storage resource status, to the task allocation unit. A sending process is shown by a dashed line with an arrow in FIG. 8. The task allocation unit may receive the resource information sent by the at least two image obtaining units. Then, the task allocation unit may select the first image obtaining unit from the at least two image obtaining units based on the resource information.

(2) The task allocation unit may determine a type of the target task, and then determine, based on a pre-established correspondence between a task type and an image obtaining unit, that the target task corresponds to the first image obtaining unit. For example, the pre-established correspondence may be an image obtaining unit 1 executing a first-type task, an image obtaining unit 2 executing a second-type task, and all image obtaining units executing a third-type task.

(3) The task allocation unit may determine area information corresponding to the target task, and then select the first image obtaining unit from the at least two image obtaining units based on the area information. For example, when a witness indicates that a suspect is found in a park, the area information of the target task may correspond to an area in the park or a larger area centered at the park. The task allocation unit may select the first image obtaining unit in the area.

In the foregoing possible embodiments of the video surveillance system, when the analysis unit is deployed in the IPC, the analysis unit may be deployed in one IPC, or the analysis units may be deployed in a plurality of IPCs simultaneously. Deploying simultaneously only indicates that the plurality of IPCs are capable of implementing the function of the analysis unit in the foregoing embodiments. However, the analysis units deployed in the plurality of IPCs may not necessarily implement the function simultaneously. In a process for executing the target task, an analysis unit implementing the function may correspond to a same IPC, or analysis units implementing the function may correspond to different IPCs. For the latter case, for example, IPCs implementing the function of the analysis unit may be IPCs that currently obtain the execution result information. All analysis units in the plurality of IPCs may be used as the IPCs implementing the function of the analysis unit. To help the IPC obtain the execution result information obtained by another IPC in time, after obtaining the third execution result information, the IPC implementing the function of the analysis unit may send the obtained third execution result information to the another IPC. Likewise, when the task allocation unit is deployed in the IPC, the task allocation unit may be deployed in one IPC, or the task allocation units may be deployed in a plurality of IPCs simultaneously. Deploying simultaneously only indicates that the plurality of IPCs are capable of implementing the function of the task allocation unit in the foregoing embodiments. However, the task allocation units deployed in the plurality of IPCs may not necessarily implement the function simultaneously. In the process for executing the target task, a task allocation unit implementing the function may correspond to a same IPC, or task allocation units implementing the function may correspond to different IPCs.

In the foregoing possible embodiments of the video surveillance system, the indication information of the target task is used to indicate how the image obtaining unit executes the target task and execution result information needs to be returned. For example, content included in the indication information of the target task may include a task identifier, a task parameter, and result information. The task identifier is used to uniquely identify a target task. The task parameter may be used as an input parameter when the IPC executes the target task. The result information is used to indicate content that needs to be included in the execution result information returned by the IPC. For example, in a facial recognition service, the task parameter can include blacklist information, a facial recognition similarity threshold, a resource required by the service, and the like. The result information may be used to indicate that the image obtaining unit needs to return information about a similarity between a face in the image and a to-be-recognized object in the blacklist information, identity information of the to-be-recognized object corresponding to the similarity information, an image obtaining moment, a location, and the like.

In the foregoing possible embodiments of the video surveillance system, after the image obtaining unit obtains the indication information of the target task, the first image obtaining unit may obtain first execution result information of the target task. The second image obtaining unit may obtain second execution result information of the target task. The first execution result information includes first processing result information corresponding to the target object in the first image obtained by the first image obtaining unit. The second execution result information includes second processing result information corresponding to the target object in the second image obtained by the second image obtaining unit. Optionally, the first processing result information may relate to characteristic information of the target object in the first image. The second processing result information relates to characteristic information of the target object in the second image. The following describes different application scenarios of the system in this application based on different types of target tasks.

1. The target task may be a three-dimensional image modeling task.

In three-dimensional image modeling, two-dimensional plane image information of the target object at different angles is first collected by using the IPC to extract characteristic information of the target object in each piece of image information. Then, three-dimensional image information of the target object is output based on the characteristic information of the target object at the different angles. To extract the detailed characteristic information of the target object, the IPC needs to provide an image at a magnification rate. In this case, when an angle of the target object is changed, the target object stays in the image for a comparatively short time. As a result, this cannot ensure capturing image information at plenty angles, and integrity of the two-dimensional plane information of the target object.

In the system of this application, the plurality of IPCs may simultaneously obtain the two-dimensional plane image information of the target object at a plurality of angles. Then, the plurality of IPCs may separately extract the characteristic information of the target object from the image, and send the execution result information of the target task to the device (the IPC or the computer apparatus) deployed by the analysis unit. The execution result information may include the characteristic information of the target object, angle information of the target object corresponding to the characteristic information, and the like. Then, the device deployed in the analysis unit may perform the three-dimensional image modeling on the target object based on the execution result information, of the target task, sent by the plurality of IPCs. Because the plurality of IPCs in the system in this application may simultaneously obtain the two-dimensional plane image information of the target object at the plurality of angles, the image information at plenty angles can be captured. This helps finally obtain more complete three-dimensional image information.

2. The target task may be an image recognition task.

Image recognition usually includes an image detection process and a target recognition process. In the image detection process, algorithm analysis is performed on the image captured by the IPC to detect a location of the target object in the image, and convert image information corresponding to the target object in the image into a series of feature indicators or number representation. The feature indicators or number representations are usually referred to as characteristic information of the target object. The characteristic information of the target object may be used as representation of an attribute of the target object in an artificial intelligence algorithm, and is applied to various actual scenarios. The different types of target objects have different representation manners for the characteristic information. For example, in the video surveillance field, typical target objects such as a face, a human body, a vehicle, and a license plate have different detection algorithms and different representation manners for the characteristic information, but have a same concept. In the target recognition process, the characteristic information of the target object, output in the image detection process is compared with pre-stored characteristic information of the to-be-recognized object, to determine the similarity information. The similarity information is usually a value of a similarity between the input characteristic information and the pre-stored characteristic information, and may be represented in a form of a percentage. A larger similarity value indicates a higher probability that the target object is the to-be-recognized object. A similarity threshold may be preset. When the obtained similarity value exceeds the similarity threshold, the target object in the image may be determined as the to-be-recognized object.

In the foregoing possible embodiments of the video surveillance system, when the target task is the image recognition task, optionally, the indication information of the target task may include the characteristic information of the to-be-recognized image. A process in which the first image obtaining unit obtains the first execution result information of the target task is used as an example, a process in which the image obtaining unit obtains the execution result information of the target task may specifically include that the first image obtaining unit extracts the first characteristic information of the target object in the first image, and then, obtains, based on the first characteristic information and the characteristic information of the to-be-recognized image, the first similarity information between the to-be-recognized object and the target object in the first image. First processing result information may include the first similarity information. Second processing result information may include second similarity information between the to-be-recognized object and a target object in a second image. After the analysis unit receives the execution result information, of the target task, sent by the image obtaining unit, the analysis unit may determine the third execution result information. Optionally, the analysis unit may separately determine weights of the first similarity information and the second similarity information. The analysis unit obtains the third similarity information between the target object and the to-be-recognized object based on the first similarity information and a weight of the first similarity information, and the second similarity information and a weight of the second similarity information.

The analysis unit may use the obtained third similarity information as the third execution result information, or optionally, after obtaining the third similarity information, the analysis unit may determine whether the third similarity information meets a second similarity condition. If the third similarity information meets the second similarity condition, the analysis unit may determine that the target task ends. The to-be-recognized object appears in the video surveillance system. If the third similarity information does not meet the second similarity condition, another operation may be performed. For example, the analysis unit may determine that the target task ends. The to-be-recognized object does not appear in the video surveillance system. Alternatively, the analysis unit may repeatedly execute the target task. For example, the analysis unit continues to receive the execution result information, of the target task, sent by the IPC, re-obtain the third similarity information between the target object and the to-be-recognized object based on the newly received execution result information and the previously received execution result information, and repeatedly perform the step of determining whether the third similarity information meets the second similarity condition.

The existing second similarity condition is usually an intermediate similarity threshold. When a value of a similarity is greater than the intermediate similarity threshold, the target object may be determined to be the same as the to-be-recognized object. When the value of the similarity is less than the intermediate similarity threshold, the target object may be determined to be different from the to-be-recognized object. A similarity threshold set in the prior art is referred to as the intermediate similarity threshold. A value of the similarity threshold is usually close to 50%. This is because if the similarity threshold is set to be excessively high, when the to-be-recognized object appears in the image, falsely determining easily occurs due to a problem such as a device factor, resulting in recognition missing. If the similarity threshold is set to be excessively low, a non-to-be-recognized object in the image is easily determined as the to-be-recognized object, resulting in over-recognition. As a result, when the similarity value obtained by a single IPC is close to the intermediate similarity threshold, a random error caused by an IPC difference may change a recognition result. In this case, reliability of a determining result of recognition made based on the similarity value obtained by the single IPC is poor. When the similarity value obtained by the single IPC is far greater than the intermediate similarity threshold, the random error caused by the IPC difference may hard to change the recognition result. In other words, in this case, the determining result of the recognition made based on the similarity value obtained by the single IPC is usually reliable. For example, it is assumed that the similarity condition is that the similarity value is greater than 60%. When the similarity value obtained by the single IPC is very high or even close to 100%, the target object may be determined to be the same as the to-be-recognized object based on the similarity value obtained by the single IPC. However, the random error generated by the IPC difference usually has little impact on the similarity value. Therefore, the determining result of the recognition made based on the similarity value obtained by the single IPC is usually reliable.

In consideration of the foregoing problem, based on the intermediate similarity threshold set in the prior art, this application provides setting a high similarity threshold. The high similarity threshold is higher than the intermediate similarity threshold. For example, the intermediate similarity threshold is 60%, and the high similarity threshold is 90%. Based on the set high similarity threshold, the following provides several optimization solutions for a system in this application:

1. The second similarity condition may be set to be higher than the high similarity threshold. When determining that third similarity information does not meet the second similarity condition, the analysis unit may repeatedly execute the target task, and continue to receive the execution result information, of the target task, sent by an IPC. The analysis unit re-obtains the third similarity information between the target object and the to-be-recognized object based on the newly received execution result information and the previously received execution result information. The analysis unit re-performs the step of determining whether the third similarity information meets the second similarity condition. This helps improve reliability of an identification result obtained by the system in this application.

2. Considering that execution of a same task by the plurality of IPCs consumes time and a resource, to reduce time and resource consumption, when the similarity value obtained by the IPC is greater than the high similarity threshold, the recognition result may be directly output. The target object in the image is determined to be the to-be-recognized object. There is no need to execute the recognition task by the plurality of IPCs. Specifically, the recognition task may be implemented from the following two aspects:

2.1. With reference to the embodiment corresponding to FIG. 8, a process in which the second image obtaining unit determines whether the second image meets the preset condition may include that the second image obtaining unit may extract second characteristic information of the target object in the second image, and then obtain the second similarity information. The second similarity information is used to indicate a similarity between the to-be-recognized object and the target object in the second image, for example, the similarity between the to-be-recognized object and the target object in the second image. Then, the second image obtaining unit may determine whether the second similarity information meets the first similarity condition (for example, less than the preset high similarity threshold). If the second similarity information meets the first similarity condition, the second image obtaining unit may determine that the second image meets the preset condition, and send initiation information of the target task to request similarity information between the target object in an image collaboratively determined by other IPCs and the to-be-recognized object. If the second similarity information does not meet the first similarity condition, the second image obtaining unit may perform another operation. For example, the second image obtaining unit directly determines that the to-be-recognized object is found, and does not send the initiation information of the target task.

2.2. After obtaining the indication information of the target task, the image obtaining unit may select, based on whether the execution result information meets a third similarity condition, whether to send the execution result information to the analysis unit. The first image obtaining unit is used as an example. After obtaining the indication information of the target task, if the first similarity information is obtained, the first image obtaining unit may determine whether the first similarity information meets the third similarity condition (for example, less than the preset high similarity threshold). If the first similarity information meets the third similarity condition, the first image obtaining unit may perform the step of sending the first execution result information to the analysis unit. If the first similarity information does not meet the third similarity condition, the second image obtaining unit may perform the another operation. For example, the second image obtaining unit directly determines that the to-be-recognized object is found, and indicate the analysis unit to end the target task.

When the similarity value obtained by the image obtaining unit is excessively low, or the target object in the image is not the to-be-recognized object, the target task is initiated based on the similarity value. As a result, the other IPCs collaboratively determine whether the target object is the to-be-recognized object, and resource waste is easily caused. Alternatively, although the target object in the image is the to-be-recognized object, the recognition missing is caused due to excessive blocking, or a poor photographing angle or photographing light. It can be learned that in this case, reference for the similarity value is low, and initiating the target task based on the similarity value easily causes the resource waste. As a basis for the analysis unit to obtain the third execution result information, the similarity value easily reduces the reliability of the result.

In consideration of the foregoing problem, based on the intermediate similarity threshold set in the prior art, this application provides setting a low similarity threshold. The low similarity threshold is lower than the intermediate similarity threshold. For example, the intermediate similarity threshold is 60%, and the low similarity threshold is 20%. Based on the set low similarity threshold, the first similarity condition described in 2.1 may be set to be higher than the low similarity threshold, or the first similarity threshold is set to be higher than the low similarity threshold and lower than the high similarity threshold. If the obtained similarity value is lower than the low similarity threshold, the second image obtaining unit may not send the initiation information of the target task to the task allocation unit, and continue to obtain the similarity value of the target object in the image. Alternatively, the third similarity threshold described in 2.2 may be set to be higher than the low similarity threshold, or the first similarity threshold may be set to be higher than the low similarity threshold and lower than the high similarity threshold. If the obtained similarity value is lower than the low similarity threshold, the second image obtaining unit may not send the obtained second execution result information to the analysis unit, and continue to execute the target task on an obtained photographed image.

A security surveillance deployment system is a typical application of a video surveillance system in this application. Security surveillance deployment specifically indicates that a plurality of IPCs are deployed in a specific area (a surveillance deployment area) to photograph an image. Each IPC performs image recognition on a target object (usually a face or a license plate) in a photographed image. Then, an identification result is reported to a server in the security surveillance deployment system for storage, or an identification result is displayed to a user through a server. Blacklist surveillance deployment is a typical application of the security surveillance deployment. A piece of blacklist information needs to be first defined on each IPC. The blacklist information usually stores characteristic information of a plurality of to-be-recognized objects (a person's face or the license plate). When the to-be-recognized object appears in the surveillance deployment area, the IPC in the area performs the image recognition on the target object in the photographed image based on the blacklist information, and can determine that the photographed image includes the to-be-recognized object. Then, the IPC may send alarm information to the server of the security surveillance deployment system. The alarm information may include determining an image including the to-be-recognized object, time information for photographing the image, location information, and the like. After receiving the alarm information, the server may trigger an alarm to an administrator for processing. Based on the method embodiment corresponding to FIG. 12, the following provides a possible application scenario of an image processing method in this application in the security surveillance deployment field.

Figure 13:
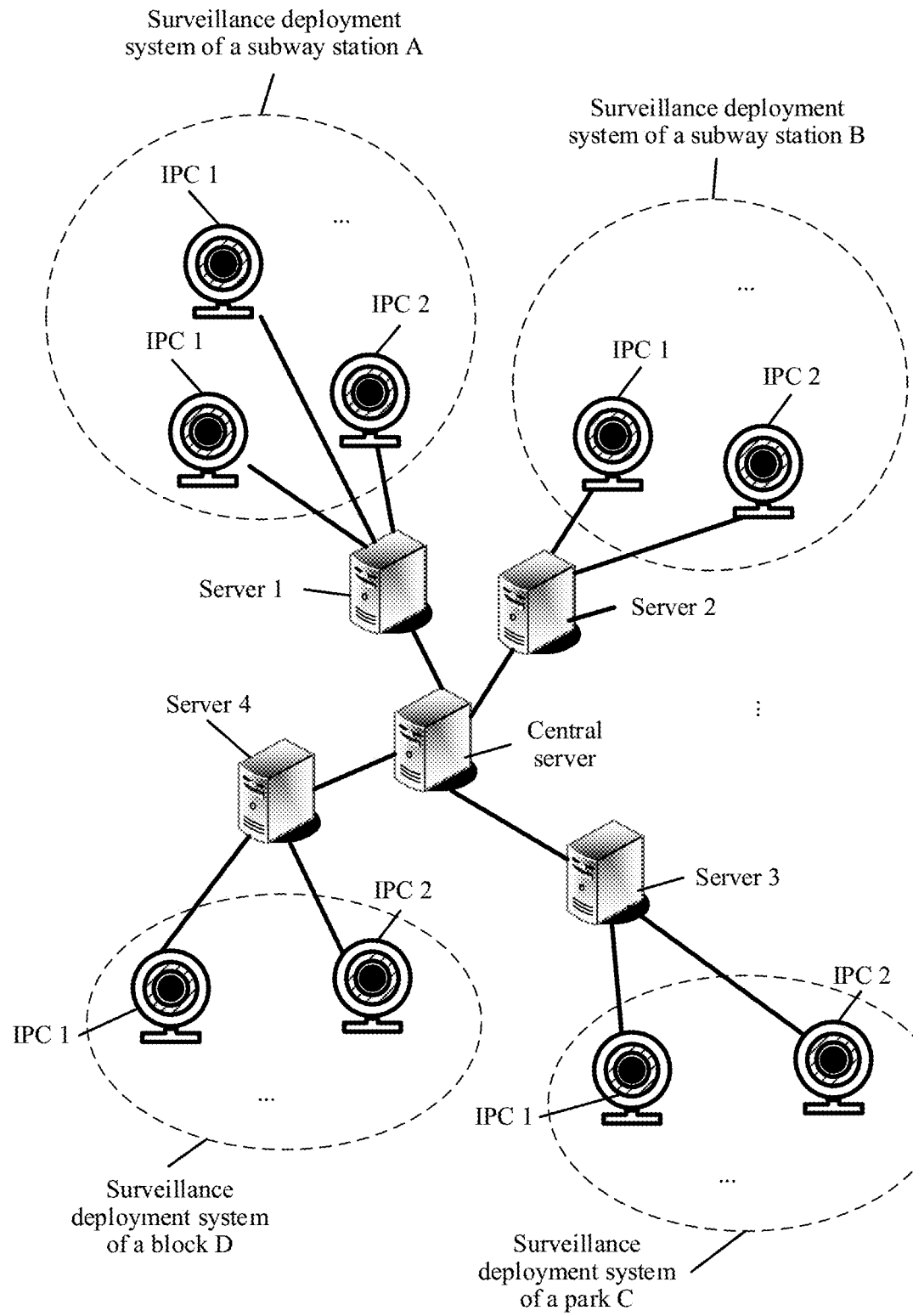
FIG. 13 is a schematic diagram of a security surveillance deployment system.
Figure 14:
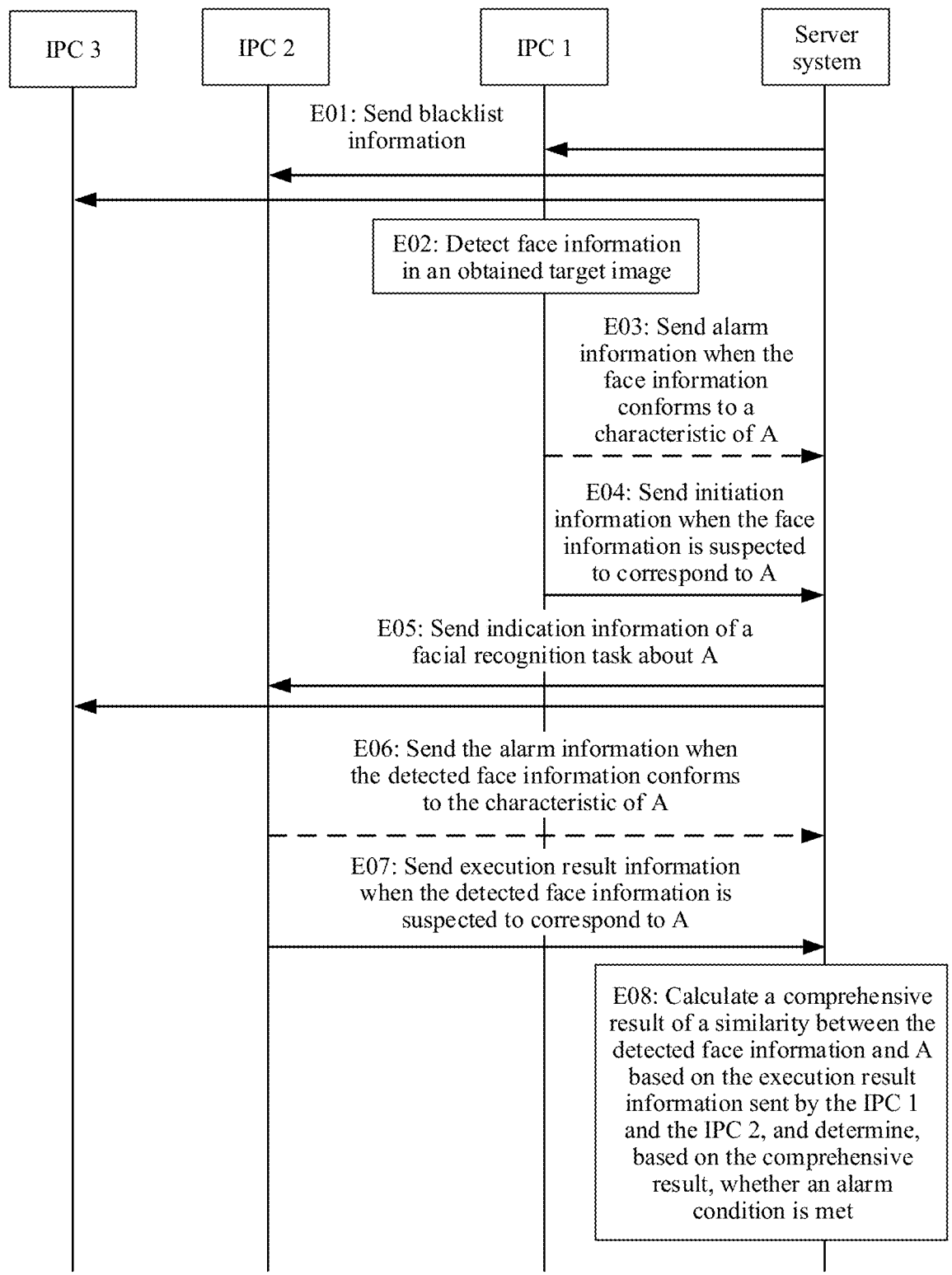
FIG. 14 shows a possible running method of a security surveillance deployment system.

FIG. 13 is a schematic diagram of a security surveillance deployment system in a city Z. The security surveillance deployment system in the city Z may include a server system and a plurality of surveillance deployment sub-systems. The surveillance deployment sub-system may include a surveillance deployment system of a subway station, a surveillance deployment system of a block, a surveillance deployment system of a park, and the like. FIG. 13 shows only some surveillance deployment sub-systems: a surveillance deployment system of a subway station A, a surveillance deployment system of a subway station B, a surveillance deployment system of a park C, and a surveillance deployment system of a block D. Based on the method embodiment corresponding to FIG. 12, referring to FIG. 14, the following provides a possible running method of a security surveillance deployment system.

E01: A server system sends blacklist information to each surveillance deployment sub-system.

The server system can send latest blacklist information to each surveillance deployment sub-system. The surveillance deployment sub-system performs image recognition on all to-be-recognized objects in the blacklist information. Considering that the blacklist information usually includes a large quantity of to-be-recognized objects, and requirements on software and hardware of an IPC are high, IPCs in the surveillance deployment sub-system can be configured differently as a primary IPC and a collaborative IPC. The primary IPC performs the image recognition in the blacklist information. The collaborative IPC executes a received target task, for example, performs the image recognition on a to-be-recognized object in the blacklist information. In addition, to reduce recognition missing, the primary IPC may be deployed at an explicit location, for example, an entrance & exit, of a surveillance deployment area.

E02: An IPC 1 detects face information in an obtained target image.

When a person appears in a photographing area corresponding to the IPC 1, the IPC 1 may detect the face information in the obtained target image. Then, as a primary IPC of a surveillance deployment system of a subway station A, the IPC 1 can perform the image recognition in the blacklist information. Specifically, the IPC 1 may extract characteristic information of a face in the target image, and compare the characteristic information of the face with characteristic information of the to-be-recognized objects in the blacklist information, to calculate a similarity between the face and each to-be-recognized object. Then, the IPC 1 may separately determine whether each obtained similarity value meets an alarm condition or a task initiation condition. For example, the alarm condition may be that a similarity value is greater than a high similarity threshold, for example, 90%. The task initiation condition is that the similarity value is lower than the high similarity threshold (for example, 90%) and higher than a low similarity threshold (for example, 20%). The alarm condition and the task initiation condition may be specified determining conditions, and are stored in the IPC 1, or may be sent by the server system to the IPC 1.

It is assumed that the detected face information in the target image corresponds to the to-be-recognized object A in the blacklist information. However, the value of the similarity between the detected face information and A, obtained by the IPC 1 may not be necessarily greater than the high similarity threshold due to a photographing angle, an environmental factor, or the like.

E03: The IPC 1 sends alarm information to the server system when the face information conforms to a characteristic of A.

When the value of the similarity between the detected face information and A, obtained by the IPC 1 meets the alarm condition, for example, higher than 90%, the IPC 1 may send the alarm information to the server system. The alarm information may include the value of the similarity between the detected face information and A, and information of the target image (for example, the target image, and a photographing time and location of the target image). After receiving the alarm information, the server system may notify an administrator for processing.

E04: The IPC 1 sends initiation information of a facial recognition task about A to the server system when the face information is suspected to correspond to A.

When the value of the similarity between the detected face information and A, obtained by the IPC 1 meets the task initiation condition, for example, less than 90% and greater than 20%, the IPC 1 may send the initiation information of the facial recognition task about A to the server system. To improve efficiency, the initiation information of the facial recognition task about A may include execution result information of the facial recognition task about A. For example, the initiation information may include the value of the similarity between the detected face information and A, and the information of the target image (for example, the target image, and the photographing time and location of the target image).

E05: The server system sends indication information of the facial recognition task about A to the surveillance deployment system of the subway station A.

After receiving the initiation information of the facial recognition task about A, the server system may select the surveillance deployment system of the subway station A from a plurality of surveillance deployment sub-systems based on the photographing location of the target image. Then, the server system may send the indication information of the facial recognition task about A to the surveillance deployment system of the subway station A, to determine whether A really appears in a surveillance deployment area of the subway station A (namely, a photographing area corresponding to the surveillance deployment system of the subway station A). The indication information may include facial characteristic information of A, the alarm condition, a collaboration condition, and the like. After receiving the indication information of the facial recognition task about A, an IPC 2 and an IPC 3 in the surveillance deployment system of the subway station A may perform the image recognition on A, to determine whether the value of the similarity between the recognized face information and A meets the alarm condition or the collaboration condition. For example, the alarm condition may be that the similarity value is greater than the high similarity threshold, for example, 90%. The collaboration condition is that the similarity value is lower than the high similarity threshold (for example, 90%) and higher than the low similarity threshold (for example, 20%).

When A enters a photographing area corresponding to the IPC 2, the value of the similarity between the detected face information and A, obtained by the IPC 1 may not necessarily be greater than the high similarity threshold due to the photographing angle, the environmental factor, or the like.

E06: The IPC 2 sends the alarm information to the server system when the detected face information conforms to the characteristic of A.

E07: The IPC 2 sends the execution result information of the facial recognition task about A to the server system when the detected face information is suspected to correspond to A.

E08: The server system calculates a comprehensive result of the similarity between the detected face information and A based on the execution result information of the facial recognition task about A, sent by the IPC 1 and the IPC 2, and determines, based on the comprehensive result, whether the alarm condition is met.

The server system may calculate a comprehensive value of the similarity between the detected face information and A according to a pre-stored algorithm for calculating the comprehensive result of the similarity, and based on the execution result information of the facial recognition task about A, sent by the IPC 1 and the IPC 2. For example, if the values of the similarities between the detected face information and A, obtained by the IPC 1 and the IPC 2 are respectively 70% and 60%, the server system may calculate a weighted average value of the values of the similarities between the detected face information and A, obtained by the IPC 1 and the IPC 2. Weights may be allocated based on the similarity value. For example, a larger similarity value corresponds to a larger weight. It is assumed that weights of the values of the similarities between the detected face information and A, obtained by the IPC 1 and the IPC 2 are 60% and 40% respectively. Therefore, the obtained weighted average value is 66%, and is used as the comprehensive result of the similarity between the detected face information and A. Then, the server system may determine, based on the comprehensive result, whether the alarm condition is met. In other words, the server system determines whether A appears in the surveillance area of the subway station A. For example, when the comprehensive result is higher than 80%, the server system may determine that A appears in the surveillance deployment area of the subway station A, and the alarm condition is met. Otherwise, the server system does not determine that A appears in the surveillance deployment area of the subway station A, and the alarm condition does not meet.

If the server system determines, based on the comprehensive result, that A appears in the surveillance deployment area of the subway station A, the server system notifies the administrator for processing. If the server system does not determine that A appears in the surveillance deployment area of the subway station A, the server system updates the comprehensive value of the similarity based on execution result information of a next collaborative IPC. Specifically, if the server system does not determine that A appears in the surveillance deployment area of the subway station A, the server system may continue to wait for the execution result information returned by the next collaborative IPC, for example, the IPC 3. When receiving the execution result information returned by the IPC 3, the server system may update the comprehensive value of the similarity based on the execution result information of the IPC 3. Specifically, the step E08 may be re-performed based on the execution result information of the IPC 3 and the obtained comprehensive result of the similarity.

It may be clearly understood by persons skilled in the art that, for the purpose of convenient and brief description, for a process in the foregoing described method embodiments, refer to the specific working process of the foregoing system, apparatus, and unit. Details are not described herein again.

In the several embodiments, it should be understood that the disclosed system, apparatus, and method may be implemented in other manners. For example, the described apparatus embodiment is merely an example. For example, division into the unit is merely logical function division and may be other division in an actual implementation. For example, a plurality of units or components may be combined or integrated into another system, or some features may be ignored or not performed. In addition, the displayed or discussed mutual couplings or direct couplings or communication connections may be implemented by using some interfaces. The indirect couplings or communication connections between the apparatuses or units may be implemented in electronic, mechanical, or other forms.

The units described as separate parts may or may not be physically separate, and parts displayed as units may or may not be physical units, may be located in one position, or may be distributed on a plurality of network units. Some or all of the units may be selected based on actual requirements to achieve the objectives of the solutions of the embodiments.

In addition, functional units in the embodiments of the present invention may be integrated into one processing unit, or each of the units may exist alone physically, or two or more units are integrated into one unit. The integrated unit may be implemented in a form of hardware, or may be implemented in a form of a software functional unit.

The foregoing embodiments are merely intended for describing the technical solutions of the present invention other than limiting the present invention. Although the present invention is described in detail with reference to the foregoing embodiments, persons of ordinary skill in the art should understand that they may still make modifications to the technical solutions described in the foregoing embodiments or make equivalent replacements to some technical features thereof, without departing from the spirit and scope of the technical solutions of the embodiments of the present invention.

What is claimed is:

1. A multi-camera collaboration-based image processing method, applied to a video surveillance system, wherein the video surveillance system comprises at least two cameras and an analysis unit, the at least two cameras comprise a first camera and a second camera, and the method comprises:
   separately obtaining, respectively by the first camera and the second camera, a photographed first image and a photographed second image;

receiving, by the first camera and the second camera, indication information of a target task, wherein the target task is image recognition and the indication information of the target task indicates characteristic information of a to-be-recognized image, a similarity condition and a process to be performed on a target object in the first and second photographed images;

separately generating, respectively by the first camera and the second camera, first execution result information and second execution result information of the target task based on the indication information of the target task, wherein the first execution result information comprises first processing result information related to characteristic information of the target object in the first image, and the second execution result information comprises second processing result information related to characteristic information of the target object in the second image;

sending, by the first camera and the second camera, the first execution result information and the second execution result information to the analysis unit; and determining, by the analysis unit, third execution result information of the target task based on the first execution result information and the second execution result information;

wherein the step of generating, by the first camera, first execution result information of the target task comprises:
  extracting, by the first camera, first characteristic information of the target object from the first image; and
  generating, by the first camera, based on the first characteristic information and the characteristic information of the to-be-recognized image, first similarity information between a to-be-recognized object and the target object in the first image; and wherein the step of sending, by the first camera, the first execution result information to the analysis unit, the method further comprises:
  determining, by the first camera, the first similarity information meets the similarity condition.

2. The method according to claim 1, wherein:
the analysis unit is a third camera different from the first camera and the second camera.

3. The method according to claim 1, wherein:
the first camera comprises the analysis unit; or
the second camera comprises the analysis unit.

4. The method according to claim 1, wherein:
the first execution result information is related to object recognition in the first image; and
the second execution result information is related to object recognition in the second image.

5. The method according to claim 1, wherein:
the first processing result information is related to similarity between a to-be-recognized object and the target object in the first image;
the second processing result information is related to similarity between the to-be-recognized object and the target object in the second image;
the third execution result information is related to similarity between the to-be-recognized object and the target object.

6. The method according to claim 1, wherein the video surveillance system further comprises a task allocation unit, and before the receiving, by the first camera, indication information of the target task, the method further comprises:
  determining, by the task allocation unit, the indication information of the target task; and
  sending, by the task allocation unit, the indication information of the target task to the first camera.

7. The method according to claim 6, wherein after the receiving, by the first camera, indication information of the target task, and before the generating, by the first camera, first execution result information of the target task based on the indication information of the target task, the method further comprises:
  determining, by the first camera, whether to accept the target task; and
  in response to the first camera accepting the target task, performing, by the first camera, the step of generating first execution result information of the target task based on the indication information of the target task.

8. The method according to claim 6, wherein after the receiving, by the task allocation unit, the indication information of the target task, and before the sending, by the task allocation unit, the indication information of the target task to the first camera, the method further comprises:
  selecting, by the task allocation unit, the first camera from the at least two cameras.

9. The method according to claim 8, wherein the selecting, by the task allocation unit, the first camera from the at least two cameras comprises:
  receiving, by the task allocation unit, resource information sent by the at least two cameras; and
  selecting, by the task allocation unit, the first camera from the at least two cameras based on the resource information.

10. The method according to claim 8, wherein the selecting, by the task allocation unit, the first camera from the at least two cameras comprises:
  determining, by the task allocation unit, a type of the target task; and
  determining, by the task allocation unit, based on a pre-established correspondence between a task type and a camera, that the target task corresponds to the first camera.

11. The method according to claim 8, wherein the selecting, by the task allocation unit, the first camera from the at least two cameras comprises:
  determining, by the task allocation unit, area information corresponding to the target task; and
  selecting, by the task allocation unit, the first camera from the at least two cameras based on the area information.

12. The method according to claim 6, wherein after the obtaining, by the second camera, the second image, and before the determining, by the task allocation unit, the indication information of the target task, the method further comprises:
  determining, by the second camera, whether the second image meets a preset condition;
  if the second image meets the preset condition, sending, by the second camera, initiation information of the target task to the task allocation unit, wherein the initiation information indicates to the task allocation unit to send the indication information of the target task; and
  the determining, by the task allocation unit, the indication information of the target task comprises:
  determining, by the task allocation unit, the indication information of the target task based on the initiation information of the target task.

13. The method according to claim 12, wherein the determining, by the second camera, whether the second image meets a preset condition comprises:

extracting, by the second camera, second characteristic information of the target object from the second image;
generating, by the second camera, second similarity information, wherein the second similarity information indicates a similarity between a to-be-recognized object and the target object in the second image;
determining, by the second camera, whether the second similarity information meets a similarity condition; and
if the second similarity information meets the similarity condition, determining, by the second camera, that the second image meets the preset condition.

14. The method according to claim 1, wherein the first processing result information comprises the first similarity information, the second processing result information comprises a second similarity information, and the second similarity information indicates the similarity between the to-be-recognized object and the target object in the second image; and
the determining, by the analysis unit, third execution result information of the target task based on the first execution result information and the second execution result information comprises:
separately determining, by the analysis unit, weights of the first similarity information and the second similarity information; and
generating, by the analysis unit, based on the first similarity information and a weight of the first similarity information, and the second similarity information and a weight of the second similarity information, third similarity information between the target object and the to-be-recognized object.

15. The method according to claim 14, wherein after the generating, by the analysis unit, based on the first similarity information and the weight of the first similarity information, and the second similarity information and the weight of the second similarity information, the third similarity information between the target object and the to-be-recognized object, the determining third execution result information of the target task based on the first execution result information and the second execution result information further comprises:
determining, by the analysis unit, whether the third similarity information meets a similarity condition; and
if the third similarity information meets the similarity condition, determining, by the analysis unit, that the to-be-recognized object appears in the video surveillance system.

16. A multi-camera collaboration-based video surveillance system, comprising at least two cameras and a processor, wherein the at least two cameras comprise a first camera and a second camera; and
the first camera is configured to: obtain a photographed first image; receive indication information of a target task, wherein the target task is image recognition and the indication information of the target task indicates characteristic information of a to-be-recognized image, a similarity condition and a process to be performed on a target object in the photographed first image; generate first execution result information of the target task based on the indication information of the target task, wherein the first execution result information comprises first processing result information related to characteristic information of the target object in the first image; and send the first execution result information to the processor;
the second camera is configured to: obtain a photographed second image; receive the indication information of the target task, wherein the indication information of the target task further indicates a process to be performed on the target object in the photographed second image; generate second execution result information of the target task based on the indication information of the target task; wherein the second execution result information comprises second processing result information related to characteristic information of the target object in the second image; and send the second execution result information to the processor; and
the processor is configured to determine third execution result information of the target task based on the first execution result information and the second execution result information;
wherein the first camera is further configured to:
extract first characteristic information of the target object from the first image, generate, based on the first characteristic information and the characteristic information of the to-be-recognized image, first similarity information between a to-be-recognized object and the target object in the first image; and
determine whether the first similarity information meets the similarity condition.

17. The system according to claim 16, further comprising a third camera, wherein:
the third camera comprises the processor, the third camera is different from the first camera and the second camera.

18. The system according to claim 16, wherein:
the first camera comprises the processor; or
the second camera comprises the processor.

19. The system according to claim 16, wherein:
the first execution result information is related to object recognition in the first image; and
the second execution result information is related to object recognition in the second image.

20. The system according to claim 16, wherein:
the first processing result information is related to similarity between a to-be-recognized object and the target object in the first image;
the second processing result information is related to similarity between the to-be-recognized object and the target object in the second image;
the third execution result information is related to similarity between the to-be-recognized object and the target object.

21. The system according to claim 16, wherein the processor is configured to receive the indication information of the target task, and send the indication information of the target task to the first camera.

22. The system according to claim 21, wherein the first camera is configured to:
after receiving the indication information of the target task, and before generating the first execution result information of the target task based on the indication information of the target task, determine whether to accept the target task, and in response to determining to accept the target task, perform the step of generating the first execution result information of the target task based on the indication information of the target task.

23. The system according to claim 21, wherein the processor is configured to: after receiving the indication information of the target task, select the first camera from the at least two cameras.

24. The system according to claim 23, wherein the processor is configured to:

receive resource information sent by the at least two cameras; and select the first camera from the at least two cameras based on the resource information.

25. The system according to claim 23, wherein the processor is further configured to:
   determine a type of the target task, and determine, based on a pre-established correspondence between a task type and a camera, that the target task corresponds to the first camera.

26. The system according to claim 23, wherein the processor is further configured to:
   determine area information corresponding to the target task, and select the first camera from the at least two cameras based on the area information.

27. The system according to claim 21, wherein the second camera is configured to:
   after obtaining the second image, determine whether the second image meets a preset condition, and if the second image meets the preset condition, send initiation information of the target task to the processor, wherein the initiation information indicates to the processor to send the indication information of the target task; and
   the processor is further configured to receive the indication information of the target task based on the initiation information of the target task.

28. The system according to claim 27, wherein the second camera is further configured to:
   extract second characteristic information of the target object from the second image; generate second similarity information, wherein the second similarity information indicates a similarity between a to-be-recognized object and the target object in the second image; determine whether the second similarity information meets a similarity condition; and
   if the second similarity information meets the similarity condition, determine that the second image meets the preset condition.

29. The system according to claim 16, wherein the first processing result information comprises the first similarity information, the second processing result information comprises a second similarity information, and the second similarity information indicates the similarity between the to-be-recognized object and the target object in the second image; and
   the processor is further configured to:
   separately determine weights of the first similarity information and the second similarity information; and generate, based on the first similarity information and a weight of the first similarity information, and the second similarity information and a weight of the second similarity information, third similarity information between the target object and the to-be-recognized object.

30. The system according to claim 29, wherein the processor is further configured to: after generating, based on the first similarity information and the weight of the first similarity information, and the second similarity information and the weight of the second similarity information, the third similarity information between the target object and the to-be-recognized object, determine whether the third similarity information meets a similarity condition, and if the third similarity information meets the similarity condition, determine that the to-be-recognized object appears in the video surveillance system.

* * * * *